US009350875B2

(12) United States Patent
Yu et al.

(10) Patent No.: US 9,350,875 B2
(45) Date of Patent: *May 24, 2016

(54) WIRELESS SUBSCRIBER BILLING AND DISTRIBUTION

(75) Inventors: Julie Yu, San Diego, CA (US); Mitchell B. Oliver, San Diego, CA (US); Gerald Charles Horel, Brentwood Bay (CA); Phil Tien Nguyen, San Diego, CA (US); Sandra L. Prast, San Diego, CA (US); Jaiteerth Patwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1514 days.

This patent is subject to a terminal disclaimer.

(21) Appl. No.: 11/141,807

(22) Filed: May 31, 2005

(65) Prior Publication Data

US 2006/0270386 A1    Nov. 30, 2006

(51) Int. Cl.
| | |
|---|---|
| *H04M 11/00* | (2006.01) |
| *H04M 15/00* | (2006.01) |
| *G06Q 30/04* | (2012.01) |
| *H04L 12/14* | (2006.01) |
| *H04M 17/00* | (2006.01) |
| *H04W 4/24* | (2009.01) |

(52) U.S. Cl.
CPC ............... *H04M 15/00* (2013.01); *G06Q 30/04* (2013.01); *H04L 12/14* (2013.01); *H04M 15/68* (2013.01); *H04M 17/00* (2013.01); *H04W 4/24* (2013.01); *H04M 2215/0196* (2013.01)

(58) Field of Classification Search
CPC .... H04W 4/24; H04W 2215/32; H04W 15/00
USPC .......................... 455/406, 411, 414.1; 705/34
See application file for complete search history.

(56) References Cited

U.S. PATENT DOCUMENTS

| | | | |
|---|---|---|---|
| 628,294 | A | 7/1899 | Alderman |
| 4,156,903 | A | 5/1979 | Barton et al. |
| 4,528,589 | A | 7/1985 | Block et al. |
| 4,975,942 | A | 12/1990 | Zebryk |
| 5,005,122 | A | 4/1991 | Griffin et al. |
| 5,013,897 | A | 5/1991 | Harman et al. |
| 5,329,619 | A | 7/1994 | Page et al. |
| 5,564,070 | A | 10/1996 | Want et al. |

(Continued)

FOREIGN PATENT DOCUMENTS

| | | |
|---|---|---|
| CA | 2267549 A1 | 9/2000 |
| CA | 2363220 A1 | 5/2003 |

(Continued)

OTHER PUBLICATIONS

International Search Report, PCT/US06/020705, International Search Authority European Patent Office, Jan. 17, 2007.

(Continued)

*Primary Examiner* — Nghi H Ly
(74) *Attorney, Agent, or Firm* — Won Tae C. Kim

(57) ABSTRACT

Systems and methods for generating and responding to billing requests in a wireless subscriber billing system are disclosed. A billing request can be generated at a trusted service. The billing request including billing information is communicated to a wireless subscriber billing system. A validation response to the billing request is generated in the wireless subscriber billing system and the validation response is communicated to the trusted service.

36 Claims, 11 Drawing Sheets

(56) References Cited

U.S. PATENT DOCUMENTS

| | | |
|---|---|---|
| 5,608,781 A | 3/1997 | Seiderman |
| 5,619,247 A | 4/1997 | Russo |
| 5,634,012 A | 5/1997 | Stefik et al. |
| 5,666,293 A | 9/1997 | Metz et al. |
| 5,666,397 A | 9/1997 | Lamons et al. |
| 5,761,485 A | 6/1998 | Munyan |
| 5,812,533 A | 9/1998 | Cox et al. |
| 5,812,988 A | 9/1998 | Sandretto |
| 5,845,267 A | 12/1998 | Ronen |
| 5,852,812 A | 12/1998 | Reeder |
| 5,857,201 A | 1/1999 | Wright, Jr. et al. |
| 5,907,837 A | 5/1999 | Ferrel et al. |
| 5,940,752 A | 8/1999 | Henrick |
| 5,956,034 A | 9/1999 | Sachs et al. |
| 5,970,490 A | 10/1999 | Morgenstern |
| 5,986,690 A | 11/1999 | Hendricks |
| 6,014,641 A | 1/2000 | Loeb et al. |
| 6,035,281 A | 3/2000 | Crosskey et al. |
| 6,047,051 A | 4/2000 | Ginzboorg et al. |
| 6,088,717 A | 7/2000 | Reed et al. |
| 6,141,404 A | 10/2000 | Westerlage et al. |
| 6,151,606 A | 11/2000 | Mendez |
| 6,181,704 B1 | 1/2001 | Drottar et al. |
| 6,185,198 B1 | 2/2001 | LaDue |
| 6,185,683 B1 | 2/2001 | Ginter et al. |
| 6,202,051 B1 | 3/2001 | Woolston |
| 6,226,618 B1 | 5/2001 | Downs et al. |
| 6,230,168 B1 | 5/2001 | Unger et al. |
| 6,230,269 B1 | 5/2001 | Spies et al. |
| 6,253,189 B1 | 6/2001 | Feezell et al. |
| 6,253,239 B1 | 6/2001 | Shklar et al. |
| 6,253,326 B1 | 6/2001 | Lincke et al. |
| 6,263,362 B1 | 7/2001 | Donoho et al. |
| 6,266,401 B1 | 7/2001 | Marchbanks et al. |
| 6,269,157 B1 | 7/2001 | Coyle |
| 6,282,294 B1 | 8/2001 | Deo et al. |
| 6,311,223 B1 | 10/2001 | Bodin et al. |
| 6,321,078 B1 | 11/2001 | Menelli et al. |
| 6,324,565 B1 | 11/2001 | Holt, III |
| 6,327,574 B1 | 12/2001 | Kramer et al. |
| 6,334,114 B1 | 12/2001 | Jacobs et al. |
| 6,334,116 B1 | 12/2001 | Ganesan et al. |
| 6,336,137 B1 | 1/2002 | Lee et al. |
| 6,343,318 B1 | 1/2002 | Hawkins et al. |
| 6,366,893 B2 | 4/2002 | Hannula et al. |
| 6,381,325 B1 | 4/2002 | Hanson et al. |
| 6,389,464 B1 | 5/2002 | Krishnamurthy et al. |
| 6,427,076 B2 | 7/2002 | Skog |
| 6,434,535 B1 | 8/2002 | Kupka et al. |
| 6,453,160 B1 | 9/2002 | Thomas et al. |
| 6,460,076 B1 | 10/2002 | Srinivasan et al. |
| 6,463,534 B1 | 10/2002 | Geiger et al. |
| 6,493,722 B1 | 12/2002 | Daleen et al. |
| 6,535,726 B1 | 3/2003 | Johnson |
| 6,549,770 B1 | 4/2003 | Marran |
| 6,597,903 B1 | 7/2003 | Dahm et al. |
| 6,598,026 B1 | 7/2003 | Ojha et al. |
| 6,606,744 B1 | 8/2003 | Mikurak |
| 6,622,017 B1 | 9/2003 | Hoffman et al. |
| 6,628,934 B2 | 9/2003 | Rosenberg et al. |
| 6,665,711 B1 | 12/2003 | Boyle et al. |
| 6,683,941 B2 | 1/2004 | Brown et al. |
| 6,704,716 B1 | 3/2004 | Force |
| 6,721,716 B1 | 4/2004 | Gross |
| 6,741,980 B1 | 5/2004 | Langseth et al. |
| 6,742,043 B1 | 5/2004 | Moussa et al. |
| 6,754,320 B2 | 6/2004 | Daase et al. |
| 6,757,710 B2 | 6/2004 | Reed |
| 6,792,271 B1 | 9/2004 | Sherman et al. |
| 6,792,280 B1 | 9/2004 | Hori et al. |
| 6,816,721 B1 | 11/2004 | Rudisill |
| 6,820,121 B1 | 11/2004 | Callis et al. |
| 6,857,067 B2 | 2/2005 | Edelman |
| 6,873,936 B2 | 3/2005 | Reed et al. |
| 6,880,750 B2 | 4/2005 | Pentel |
| 6,883,142 B2 | 4/2005 | Shimamoto et al. |
| 6,928,441 B2 | 8/2005 | Haegele |
| 6,937,996 B1 | 8/2005 | Forsythe et al. |
| 6,941,139 B1 | 9/2005 | Shupe et al. |
| 6,941,270 B1 | 9/2005 | Hannula |
| 6,954,793 B2 | 10/2005 | Ramaswamy et al. |
| 6,957,793 B2 | 10/2005 | Gautier et al. |
| 6,965,883 B2 | 11/2005 | Xu et al. |
| 6,978,273 B1 | 12/2005 | Bonneau et al. |
| 6,985,882 B1 | 1/2006 | Del Sesto |
| 6,996,537 B2 | 2/2006 | Minear et al. |
| 7,010,303 B2 | 3/2006 | Lewis et al. |
| 7,010,500 B2 | 3/2006 | Aarnio |
| 7,013,289 B2 | 3/2006 | Horn et al. |
| 7,020,688 B2 | 3/2006 | Sykes, Jr. |
| 7,039,389 B2 | 5/2006 | Johnson, Jr. |
| 7,043,447 B2 | 5/2006 | Hughes et al. |
| 7,047,405 B2 | 5/2006 | Mauro et al. |
| 7,068,680 B1 | 6/2006 | Kaltenmark et al. |
| 7,099,891 B2 | 8/2006 | Harris et al. |
| 7,113,766 B2 | 9/2006 | Horel et al. |
| 7,117,504 B2 | 10/2006 | Smith et al. |
| 7,155,205 B2 | 12/2006 | Cerami et al. |
| 7,177,837 B2 | 2/2007 | Pegaz-Paquet et al. |
| 7,184,747 B2 | 2/2007 | Bogat |
| 7,200,566 B1 | 4/2007 | Moore et al. |
| 7,206,842 B2 | 4/2007 | Nainani et al. |
| 7,218,917 B2 | 5/2007 | Pradhan et al. |
| 7,228,333 B1 | 6/2007 | Smith |
| 7,233,790 B2 | 6/2007 | Kjellberg et al. |
| 7,260,194 B1 | 8/2007 | Meyers et al. |
| 7,269,654 B2 | 9/2007 | Srinivas |
| 7,278,164 B2 | 10/2007 | Raiz et al. |
| 7,286,655 B2 | 10/2007 | Voorman et al. |
| 7,293,099 B1 | 11/2007 | Kalajan |
| 7,334,025 B2 | 2/2008 | Kuriya et al. |
| 7,362,745 B1 | 4/2008 | Cope et al. |
| 7,370,120 B2 | 5/2008 | Kirsch et al. |
| 7,404,148 B2 | 7/2008 | Lincke et al. |
| 7,415,439 B2 | 8/2008 | Kontio et al. |
| 7,436,816 B2 | 10/2008 | Mehta et al. |
| 7,444,411 B2 | 10/2008 | Sung |
| 7,467,198 B2 | 12/2008 | Goodman et al. |
| 7,490,045 B1 | 2/2009 | Flores et al. |
| 7,526,450 B2 | 4/2009 | Hughes et al. |
| 7,574,377 B2 | 8/2009 | Carapelli |
| 7,577,616 B2 | 8/2009 | Zhu |
| 7,583,953 B2 | 9/2009 | Choi et al. |
| 7,660,755 B2 | 2/2010 | Amato et al. |
| 7,711,680 B2 | 5/2010 | Barnes-Leon et al. |
| 7,752,217 B2 | 7/2010 | Sawashima et al. |
| 7,894,803 B2 | 2/2011 | Kamada |
| 7,904,528 B2 | 3/2011 | Zilliacus et al. |
| 7,907,937 B2 | 3/2011 | Engelhart |
| 8,028,056 B1 | 9/2011 | Krishna et al. |
| 8,150,736 B2 | 4/2012 | Horn et al. |
| 8,489,470 B2 | 7/2013 | Kahlon et al. |
| 2001/0013020 A1 | 8/2001 | Yoshida et al. |
| 2001/0032254 A1 | 10/2001 | Hawkins |
| 2001/0034686 A1 | 10/2001 | Eder |
| 2001/0036271 A1 | 11/2001 | Javed |
| 2001/0037192 A1 | 11/2001 | Shimamoto et al. |
| 2001/0037304 A1 | 11/2001 | Paiz |
| 2001/0056362 A1 | 12/2001 | Hanagan et al. |
| 2002/0002603 A1 | 1/2002 | Vange |
| 2002/0004935 A1 | 1/2002 | Huotari et al. |
| 2002/0019764 A1 | 2/2002 | Mascarenhas |
| 2002/0022472 A1 | 2/2002 | Watler et al. |
| 2002/0022971 A1 | 2/2002 | Tanaka et al. |
| 2002/0029197 A1 | 3/2002 | Kailamaki et al. |
| 2002/0029200 A1* | 3/2002 | Dulin et al. ............. 705/67 |
| 2002/0029347 A1 | 3/2002 | Edelman |
| 2002/0035688 A1 | 3/2002 | Kutaragi et al. |
| 2002/0035699 A1 | 3/2002 | Crosbie |
| 2002/0038369 A1 | 3/2002 | Sung et al. |
| 2002/0049717 A1 | 4/2002 | Routtenberg et al. |
| 2002/0052754 A1 | 5/2002 | Joyce et al. |
| 2002/0052968 A1 | 5/2002 | Donefas et al. |
| 2002/0062290 A1 | 5/2002 | Ricci |

(56) References Cited

U.S. PATENT DOCUMENTS

| | | |
|---|---|---|
| 2002/0069176 A1 | 6/2002 | Newman |
| 2002/0069244 A1 | 6/2002 | Blair et al. |
| 2002/0069263 A1 | 6/2002 | Sears |
| 2002/0071559 A1 | 6/2002 | Christensen et al. |
| 2002/0083006 A1 | 6/2002 | Headings et al. |
| 2002/0083050 A1 | 6/2002 | Liu et al. |
| 2002/0107706 A1 | 8/2002 | Oliver et al. |
| 2002/0107795 A1 | 8/2002 | Minear et al. |
| 2002/0107809 A1 | 8/2002 | Biddle |
| 2002/0109706 A1 | 8/2002 | Lincke et al. |
| 2002/0111904 A1* | 8/2002 | Gruber et al. .................. 705/39 |
| 2002/0128908 A1 | 9/2002 | Levin et al. |
| 2002/0128984 A1 | 9/2002 | Mehta et al. |
| 2002/0129108 A1 | 9/2002 | Sykes, Jr. et al. |
| 2002/0129165 A1 | 9/2002 | Dingsor et al. |
| 2002/0131401 A1 | 9/2002 | Ehreth |
| 2002/0131404 A1 | 9/2002 | Mehta et al. |
| 2002/0160752 A1 | 10/2002 | Hook et al. |
| 2002/0162112 A1 | 10/2002 | Javed |
| 2002/0164025 A1 | 11/2002 | Raiz et al. |
| 2002/0165822 A1 | 11/2002 | Makipaa |
| 2002/0176553 A1 | 11/2002 | Aschir |
| 2002/0190120 A1 | 12/2002 | Pentel et al. |
| 2002/0194143 A1 | 12/2002 | Banerjee et al. |
| 2002/0194357 A1 | 12/2002 | Harris et al. |
| 2003/0005136 A1 | 1/2003 | Eun |
| 2003/0023550 A1 | 1/2003 | Lee |
| 2003/0028903 A1 | 2/2003 | Hofrichter et al. |
| 2003/0033209 A1 | 2/2003 | Minear et al. |
| 2003/0046396 A1 | 3/2003 | Richter et al. |
| 2003/0051047 A1 | 3/2003 | Horel et al. |
| 2003/0060188 A1 | 3/2003 | Gidron et al. |
| 2003/0074328 A1 | 4/2003 | Schiff et al. |
| 2003/0078844 A1 | 4/2003 | Takatori et al. |
| 2003/0078886 A1 | 4/2003 | Minear et al. |
| 2003/0078895 A1 | 4/2003 | MacKay |
| 2003/0083973 A1 | 5/2003 | Horsfall |
| 2003/0083991 A1 | 5/2003 | Kikinis |
| 2003/0093461 A1 | 5/2003 | Suzuki et al. |
| 2003/0093565 A1 | 5/2003 | Berger et al. |
| 2003/0096591 A1 | 5/2003 | Pohutsky et al. |
| 2003/0110044 A1 | 6/2003 | Nix et al. |
| 2003/0110213 A1 | 6/2003 | Munetsugu et al. |
| 2003/0110296 A1 | 6/2003 | Kirsch et al. |
| 2003/0112927 A1 | 6/2003 | Brown et al. |
| 2003/0120594 A1 | 6/2003 | Shaginaw et al. |
| 2003/0149958 A1 | 8/2003 | Baluja et al. |
| 2003/0151621 A1 | 8/2003 | McEvilly et al. |
| 2003/0172165 A1 | 9/2003 | Xu et al. |
| 2003/0176182 A1 | 9/2003 | Cerami et al. |
| 2003/0197719 A1 | 10/2003 | Lincke et al. |
| 2003/0208444 A1 | 11/2003 | Sauer |
| 2003/0208532 A1* | 11/2003 | Kuriya ........................ 709/203 |
| 2003/0212904 A1 | 11/2003 | Randle et al. |
| 2003/0233329 A1 | 12/2003 | Laraki et al. |
| 2003/0236867 A1 | 12/2003 | Natsuno et al. |
| 2004/0002923 A1 | 1/2004 | Ramaswamy et al. |
| 2004/0006517 A1 | 1/2004 | Takatori |
| 2004/0015413 A1 | 1/2004 | Abu-Hejleh et al. |
| 2004/0015416 A1 | 1/2004 | Foster et al. |
| 2004/0015562 A1 | 1/2004 | Harper et al. |
| 2004/0030601 A1 | 2/2004 | Pond et al. |
| 2004/0032936 A1 | 2/2004 | Horel et al. |
| 2004/0043753 A1 | 3/2004 | Wake et al. |
| 2004/0044623 A1 | 3/2004 | Wake et al. |
| 2004/0054786 A1 | 3/2004 | Kjellberg et al. |
| 2004/0116119 A1 | 6/2004 | Lewis et al. |
| 2004/0137890 A1 | 7/2004 | Kalke |
| 2004/0139012 A1 | 7/2004 | Koskinen et al. |
| 2004/0181591 A1 | 9/2004 | Yu et al. |
| 2004/0267630 A1 | 12/2004 | Au et al. |
| 2005/0027872 A1 | 2/2005 | Srinivas et al. |
| 2005/0086348 A1 | 4/2005 | Balassanian |
| 2005/0090258 A1 | 4/2005 | Coppinger et al. |
| 2005/0113092 A1 | 5/2005 | Coppinger et al. |
| 2005/0114155 A1 | 5/2005 | Hodges et al. |
| 2005/0125315 A1 | 6/2005 | Munoz et al. |
| 2005/0132049 A1 | 6/2005 | Inoue et al. |
| 2005/0148319 A1 | 7/2005 | Himeno |
| 2005/0192878 A1* | 9/2005 | Minear et al. ................ 705/34 |
| 2005/0289047 A1 | 12/2005 | Oliver et al. |
| 2006/0014535 A1 | 1/2006 | Walker et al. |
| 2006/0015565 A1 | 1/2006 | Nainani et al. |
| 2006/0080232 A1 | 4/2006 | Epps |
| 2006/0143119 A1 | 6/2006 | Krueger et al. |
| 2006/0173758 A1 | 8/2006 | Minear et al. |
| 2006/0235931 A1 | 10/2006 | Ruthe et al. |
| 2006/0253350 A1 | 11/2006 | Falkenhain et al. |
| 2006/0271449 A1 | 11/2006 | Oliver et al. |
| 2007/0003034 A1 | 1/2007 | Schultz et al. |
| 2007/0038703 A1 | 2/2007 | Tendjoukian et al. |
| 2007/0066279 A1 | 3/2007 | Silverbrook et al. |
| 2007/0083464 A1 | 4/2007 | Cordero Torres et al. |
| 2007/0123229 A1 | 5/2007 | Pousti |
| 2007/0169163 A1 | 7/2007 | Morio et al. |
| 2007/0174308 A1 | 7/2007 | Rausch |
| 2007/0197188 A1 | 8/2007 | Sprigg et al. |
| 2007/0197189 A1 | 8/2007 | Horel et al. |
| 2011/0030042 A1 | 2/2011 | Neal-Joslin |
| 2011/0143709 A1 | 6/2011 | Pousti |
| 2012/0309345 A1 | 12/2012 | Wake et al. |

FOREIGN PATENT DOCUMENTS

| | | |
|---|---|---|
| CN | 1147325 A | 4/1997 |
| CN | 1459183 A | 11/2003 |
| EP | 0780802 A2 | 6/1997 |
| EP | 0895148 | 2/1999 |
| EP | 1026610 A2 | 8/2000 |
| EP | 1026853 | 8/2000 |
| EP | 1033652 | 9/2000 |
| EP | 1047030 A2 | 10/2000 |
| EP | 1102191 | 5/2001 |
| EP | 1122967 A2 | 8/2001 |
| EP | 1162807 | 12/2001 |
| EP | 1204054 A2 | 5/2002 |
| EP | 1403797 A1 | 3/2004 |
| EP | 1404100 A1 | 3/2004 |
| EP | 1414185 A2 | 4/2004 |
| FR | 2775550 | 9/1999 |
| GB | 2349548 | 11/2000 |
| JP | 07044261 A | 2/1995 |
| JP | 2007-319691 | 8/1995 |
| JP | 07319691 A | 12/1995 |
| JP | 09319573 | 12/1997 |
| JP | 1066050 | 3/1998 |
| JP | 10140283 | 5/1998 |
| JP | 10260873 | 9/1998 |
| JP | 10262059 A | 9/1998 |
| JP | 11053185 A | 2/1999 |
| JP | 11055252 A | 2/1999 |
| JP | 11069017 | 3/1999 |
| JP | 11126188 A | 5/1999 |
| JP | 200056967 | 2/2000 |
| JP | 2000078129 A | 3/2000 |
| JP | 2000505568 A | 5/2000 |
| JP | 2000357196 A | 12/2000 |
| JP | 2001195451 A | 7/2001 |
| JP | 2001202434 A | 7/2001 |
| JP | 2001-250069 | 9/2001 |
| JP | 2001-312324 | 9/2001 |
| JP | 2001243382 A | 9/2001 |
| JP | 2001265938 | 9/2001 |
| JP | 2001268623 A | 9/2001 |
| JP | 2001-320509 | 11/2001 |
| JP | 2001312666 A | 11/2001 |
| JP | 2001319168 A | 11/2001 |
| JP | 2001325234 | 11/2001 |
| JP | 2001352583 | 12/2001 |
| JP | 2002007839 A | 1/2002 |
| JP | 2002015160 A | 1/2002 |
| JP | 2002-027151 | 2/2002 |
| JP | 2002-91850 | 3/2002 |
| JP | 2002093361 A | 3/2002 |

(56) References Cited

FOREIGN PATENT DOCUMENTS

| | | |
|---|---|---|
| JP | 2002094450 A | 3/2002 |
| JP | 2002101315 A | 4/2002 |
| JP | 2002109395 A | 4/2002 |
| JP | 2002-099289 | 5/2002 |
| JP | 2002-99441 | 5/2002 |
| JP | 2002132367 | 5/2002 |
| JP | 2002133316 A | 5/2002 |
| JP | 2002-175387 | 6/2002 |
| JP | 2002163258 | 6/2002 |
| JP | 2002163467 A | 6/2002 |
| JP | 2002197294 | 7/2002 |
| JP | 2002245350 A | 8/2002 |
| JP | 2002279103 A | 9/2002 |
| JP | 2002329249 A | 11/2002 |
| JP | 2002335336 | 11/2002 |
| JP | 2002345030 A | 11/2002 |
| JP | 2002353885 A | 12/2002 |
| JP | 2003016041 A | 1/2003 |
| JP | 2003016093 | 1/2003 |
| JP | 2003518885 A | 6/2003 |
| JP | 2003187083 A | 7/2003 |
| JP | 2004004157 A | 1/2004 |
| JP | 2004005044 A | 1/2004 |
| JP | 2004135229 A | 4/2004 |
| JP | 2004185197 | 7/2004 |
| JP | 2004220546 | 8/2004 |
| JP | 3609398 | 1/2005 |
| JP | 2005078325 A | 3/2005 |
| JP | 2005519407 A | 6/2005 |
| JP | 2005198021 A | 7/2005 |
| JP | 2005537544 | 12/2005 |
| JP | 2006505966 A | 2/2006 |
| JP | 2006520173 | 8/2006 |
| JP | 2007527570 A | 9/2007 |
| JP | 2008514743 A | 5/2008 |
| JP | 2010178027 A | 8/2010 |
| KR | 2000-72521 | 12/2000 |
| KR | 20010078968 | 8/2001 |
| KR | 20010078968 A | 8/2001 |
| KR | 20020039648 | 5/2002 |
| KR | 20020039648 A | 5/2002 |
| KR | 2003-0042660 | 6/2003 |
| KR | 102003005056 | 6/2003 |
| KR | 20030078446 | 10/2003 |
| KR | 20070007954 | 1/2007 |
| RU | 2165679 | 4/2001 |
| RU | 2191482 | 10/2002 |
| RU | 2212057 | 9/2003 |
| TW | 161301 | 6/1991 |
| TW | 388021 | 4/2000 |
| TW | 466858 | 12/2001 |
| TW | 499645 | 8/2002 |
| WO | WO9308545 A1 | 4/1993 |
| WO | 9703410 A1 | 1/1997 |
| WO | 9726739 A1 | 7/1997 |
| WO | 9745814 | 12/1997 |
| WO | WO9821676 | 5/1998 |
| WO | 9931610 | 6/1999 |
| WO | 9941861 A1 | 8/1999 |
| WO | 9952077 | 10/1999 |
| WO | 0002112 A2 | 1/2000 |
| WO | WO0031672 A1 | 6/2000 |
| WO | WO-0043962 A1 | 7/2000 |
| WO | 0056033 | 9/2000 |
| WO | 0079451 | 12/2000 |
| WO | 0143390 A2 | 6/2001 |
| WO | 0150305 A2 | 7/2001 |
| WO | WO-0149048 A1 | 7/2001 |
| WO | 0163900 A1 | 8/2001 |
| WO | WO 0163532 | 8/2001 |
| WO | 0169891 | 9/2001 |
| WO | 0197104 | 12/2001 |
| WO | 0203219 A1 | 1/2002 |
| WO | WO 0231718 | 4/2002 |
| WO | WO 0244892 A2 | 6/2002 |
| WO | 02063537 | 8/2002 |
| WO | 02067600 | 8/2002 |
| WO | WO02063536 A2 | 8/2002 |
| WO | WO-02073934 A2 | 9/2002 |
| WO | WO-02093361 A1 | 11/2002 |
| WO | WO-02103459 A2 | 12/2002 |
| WO | 03017171 A1 | 2/2003 |
| WO | WO-03032618 A1 | 4/2003 |
| WO | 03050743 A1 | 6/2003 |
| WO | 03075584 A2 | 9/2003 |
| WO | 03079256 A1 | 9/2003 |
| WO | WO-03085943 A1 | 10/2003 |
| WO | 2004003708 A2 | 1/2004 |
| WO | WO2004021131 A2 | 3/2004 |
| WO | 2004084526 A2 | 9/2004 |
| WO | WO2004082245 | 9/2004 |
| WO | 2005008383 A2 | 1/2005 |
| WO | WO 2005004456 | 1/2005 |
| WO | WO2005020027 A2 | 3/2005 |
| WO | WO-2005069917 | 8/2005 |

OTHER PUBLICATIONS

Arar, Yardena, "Download apps to a phone," PC World, Jun. 2002, v20i6.p. 64, Proquest #120993020 3 pgs.

Qualcomm; "Binary Runtime Environment for Wireless, BREW Application note: Developing BREW Applications for Devices with RUIM Units" (Online) Jan. 10, 2005, pp. 1-11, XP002410586 San Diego Retrieved from the internet: URL:http://brew.qualcomm.com/brew_bnry/pdf/.

Qualcomm; BREW Distribution System (BDS) Overview (online) 2003, pp. 1-17, XP002410587 San Diego Retrieved from the Internet: URL:http.wirelessknowledge.com/brew/images/about/pdf/bds.pdf> [retrieved on Dec. 6, 2006] the whole document.

Office Action dated Nov. 30, 2007, U.S. Appl. No. 11/141,934.

Request for Reconsideration, dated Mar. 4, 2008, U.S. Appl. No. 11/141,934.

Office Action dated Jun. 12, 2008, U.S. Appl. No. 11/141,934.

Request for Reconsideration, dated Aug. 12, 2008, U.S. Appl. No. 11/141,934.

"SYNCML Representation Protocol, Version 1.0" SYNCML Representation Protocol, (Dec. 7, 2000), pp. 1-104, Chapters 1-4.

Atsuyuki Morishima, "Efficient Construction of Materialized XML Views With Silkroute", IPSJ SIG Notes, Japan, Information Processing Society of Japan, Jul. 17, 2001, vol. 2001, No. 70, pp. 421-428.

Butrico M A et al: "Gold Rush: Mobile Transaction Middleware With Java-Object Replication" Conference on Object-Oriented Technologies, (Jun. 16, 1997), pp. 91-101.

Goldenberg-Hart, Diane, "A Glossary of Selected Internet and Computing Terms" Yale University Library, Jun. 1996, Retrieved from http://www.library.yale.edu/ref/internet/intgloss.htm.

International Search Report—PCT/US02/025749, International Search Authority—US, Jan. 22, 2003.

M2 Presswire. Convergys: Genie Mobile chooses Geneva Billing software, continuing the momentum of the merger between Convergys and Geneva Technology. Coventry: Jun. 1 2001, p. 1.

No Author. "AvantGo 4.0 Powers Wireless Applications and Services," Customer Inter@ction Solutions, May 2001, vol. 19, Issue 11, p. 71.

No Author. "Sony Pictures to Sell Movies via Internet," Jul. 9, 2001, Source: Japan Computer Industry Scan.

PR Newswire. China Unicom Selects QUALCOMM's BREW Solution as Its Platform to Launch Wireless Data Applications. New York, Aug. 26, 2002, p. 1.

Rigdon, Joan E., "CyberSource Begins to Offer Software of Symantec and Others on the Internet," Wall Street Journal, Jan. 31, 1995.

SYNCML Consortium: "SYNCML Sync Protocol, Version 1.0" (Dec. 7, 2000), Chapters 1,2,5-8.

SYNCML Consortium: "SYNCML Sync Protocol, Version 1.0.1" (Jun. 15, 2001).

Amendment dated Oct. 14, 2008, U.S. Appl. No. 11/141,934.

(56) References Cited

OTHER PUBLICATIONS

USA Group Selects Clikc-N-Done for Electronic Bill Presentment and Patment; Software Will Support Online Presentment and Payment for Education Loan Borrowers Business Editors, Internet Writers. Business Wire. New York: Apr 24, 2000. p. 1.
Written Opinion—PCT/US06/020705, International Search Authority European Patent Office, Jan. 17, 2007.
Anonymous, "BPM In Action: Universe," Intelligent Enterprise, San Mateo, May 15, 2004, vol. 7, Issue 8, 2 pages (recovered from ProQuest on Jun. 5, 2009).
Office Action dated Jan. 7, 2009, U.S. Appl. No. 11/141,934.
Office Action dated Sep. 12, 2008, U.S. Appl. No. 11/141,934.
Business Wire, Informer Announces Key Customer Wins in Fourth Quarter; Leading Companies and Government Entities in Key Markets Around the World Respond to Informer's Technology Strategy Business/Technology Editors. Business Wire. New York: Jan, 27, 1999, p. 1.
Amendment dated Aug. 8, 2007, U.S. Appl. No. 11/141,807.
Amendment dated Dec. 23, 2007, U.S. Appl. No. 11/141,807.
Declaration of Non-Establishment of International Search Report—PCT/US05/022837, International Search Authority—European Patent Office, Sep. 22, 2005.
Diebold Teams with Health System Services to Offer a Complete Distribution Package for Pharmacy Medication and Supplies PR Newswire. New York: May 28, 1998. p. 1.
Office Action dated Jan. 31, 2008, U.S. Appl. No. 11/141,807.
Office Action dated May 2, 2007, U.S. Appl. No. 11/141,807.
Office Action dated Oct. 22, 2007, U.S. Appl. No. 11/141,807.
Statement in accordance with the Notice from the European Patent Office dated Oct. 1, 2007 concerning business methods, Official Journal of the European Patent Office, Nov. 1, 2007, pp. 592-593, European Patent Office, Munich, Germany, XP007905525.
European Search Report—EP10172294, Search Authority—Munich Patent Office, Nov. 25, 2010.
Fujii, H. "BREW application, flexibility in development comparable to PCs, powerful in enterprise system cooperation of cellular phones," Solution IT, vol. 14, No. 11, Japan, RIC Telecom, Nov. 1, 2002, pp. 22-24.
Translation of Office Action in Japan application 2004-531867 corresponding to U.S. Appl. No. 10/231,970, dated Mar. 29, 2011.
Translation of Office Action in Japan application 2008-514743 corresponding to U.S. Appl. No. 11/141,807, dated Nov. 9, 2010.
European Search Report—EP10172296—Search Authority—Munich—Aug. 10, 2011.
Anonymous: "BREW TM Application Note: Developing BREW Applications for Devices with RUIM Units", May 14, 2005, pp. 1-11, XP007920607, Retrieved from the Internet: URL:http://web.archive.org/web/20050514075656/http://brew.qualcomm.com/brew_bnry/pdf/developer/resources/ds/Dev_BREW_Apps.pdf.
Anonymous: "Internet Archive Wayback Machine", Internet Citation, May 14, 2005, p. 1, XP007920684, Retrieved from the Internet: URL:http://wayback.archive.org/web/200506150000007*/http://brew.qualcomm.com/brew_bnry/pdf/developer/resources/ds/Dev_BREW_Apps.pdf [retrieved on Jun. 4, 2012].
Telesens: TelesensKSCL and Comptel sign strategic agreement; New alliance expands best of suite billing offering and furthers drive towards comprehensive next generation solution for network service providers M2 Presswire, Coventry, Nov. 28, 2000, p. 1.
Classified Ad 3—No Title, New York Daily Times (1851-1857); Nov. 15, 1853; ProQuest Historical Newspapers: The New York Times (1851-2008) p. 4.
Classified Ad 74—No Title. Chicago Daily Tribune (1923-1963); Oct. 11, 1959; ProQuest Historical Newspapers: Chicago Tribune (1849-1989) p. G34.
"Ellipsus' Mobile Aplication Provisioning System", Internet Citation, Dec. 2, 2001, XP002266188, Retrieved from the Internet: URL: web.archive.orgfwww.ellipsus.com [retrieved on Jan. 7, 2004].
"How can wireless models help my business?", Computer Weekly, Dec. 2, 2003; p. 1-5, Available from: Business Source Complete, Ipswich, MA. Accessed Jul. 1, 2013.
Mcauliffe W., "Broadband heading for move to metered billing", New Media Age, Apr. 29, 2004; p. 1, Available from: Business Source Complete, Ipswich, MA. Accessed Jul. 1, 2013.
Oommen P., "Over the Air Handset Management," Emerging Technologies Symposium, Broadband, Wireless Internet Access, 2000, IEEE Apr. 10-11, 2000, Piscataway, NJ, USA, IEEE, Apr. 10, 2000, pp. 1-4, XP010538894, ISBN: 0-7803-6364-7.
Floyd R, et al., "Mobile Web Access Using Enetwork Web Express", IEEE Personal Communications, IEEE Communications Society, US, vol. 5, No. 5, Oct. 1, 1998, pp. 47-52, XP000786616.
Seifert A., et al. "A Multi-Version Cache Replacement and Prefetching Policy for Hybrid Data Delivery Environments," Proceeding VLDB '02 Proceedings of the 28th international conference on Very Large, Jan. 1, 2002, pp. 850-861, XP055148735.

* cited by examiner

WIRELESS SUBSCRIBER BILLING AND DISTRIBUTION

REFERENCE TO CO-PENDING APPLICATIONS FOR PATENT

The present Application for Patent is related to the co-pending U.S. patent application Ser. No. 11/141,934 entitled "WIRELESS SUBSCRIBER APPLICATION AND CONTENT DISTRIBUTION AND DIFFERENTIATED PRICING" by Mitchell Oliver, Jerry Horel, and Brian Minear, filed concurrently herewith, assigned to the assignee hereof, and expressly incorporated by reference herein.

BACKGROUND OF THE INVENTION

1. Field

The present invention generally relates to communications between remote computing devices and servers. More particularly, the invention relates to the creation and sending of billing events between a server and a remote client device.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. However, these smaller and more powerful personal computing devices are typically severely resource constrained. For example, the screen size, amount of available memory and file system space, amount of input and output capabilities and processing capability may each be limited by the small size of the device, and in particular, the small size of the user input unit, e.g., the keyboard. Because of such severe resource constraints, it is often typically desirable, for example, to maintain a limited size and quantity of software applications and other information residing on such remote personal computing devices (client devices).

Some of the personal computing devices utilize application programming interfaces (APIs), sometimes referred to as runtime environments and software platforms, that are installed onto their local computer platform and which are used, for example, to simplify operations of such devices, such as by providing generalized calls for device specific resources. Further, some such APIs are also known to provide software developers the ability to create software applications that are fully executable on such devices. In addition, some of such APIs are known to be operationally located between the computing device system software and the software applications such that the computing device computing functionality is made available to the software applications without requiring the software developer to have the specific computing device system source code. Further, some APIs are known to provide mechanisms for secure communications between such personal devices (i.e., clients) and remote devices (i.e., servers) using secure cryptographic information.

Examples of such APIs, some of which are discussed in more detail below, include versions of the Binary Runtime Environment for Wireless software (BREW®) developed by QUALCOMM, Inc., of San Diego, Calif,. BREW® can cooperate with a computing device's (e.g., a wireless cellular phone) operating system, and can, among other features, provide interfaces to hardware features particularly found on personal computing devices. BREW® can also provide these interfaces on such personal computing devices at a relatively low cost with respect to demands on device resources and with respect to the price paid by consumers for devices containing BREW®. Additional features of BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security and application distribution functionality, and the client performs, for example, application execution, security and user interface functionality.

The foregoing description of the related art is merely intended to provide an overview of some of the known uses of APIs and as an introduction to the BREW® platform, which can be used in embodiments of the invention. However, the invention is not to be construed as being limited to a specific implementation, operating platform or environment.

SUMMARY OF THE EXEMPLARY EMBODIMENTS

Exemplary embodiments of the present invention are directed to a system and method for generating and processing billing requests in a wireless network.

Accordingly, an embodiment of the invention can include a method comprising: generating a billing request at a trusted service; communicating the billing request including billing information to a wireless subscriber billing system; generating a validation response to the billing request in the wireless subscriber billing system; and communicating the validation response to the trusted service.

Another embodiment of the invention can include an apparatus comprising: a service value billing (SVB) module in a wireless subscriber billing system configured to receive a billing request from a trusted service and to authenticate the trusted service; and validation logic configured to generate a validation response in response to the billing request.

Another embodiment of the invention can include a system comprising: means for receiving a billing request including billing information from a trusted service at a wireless subscriber billing system; means for generating a validation response to the billing request in the wireless subscriber billing system; and means for communicating the validation response to the trusted service.

Another embodiment of the invention can include a computer-readable medium on which is stored a computer program for processing billing requests in a wireless subscriber billing system, the computer program comprising instructions which, upon being executed, causes the computing device to perform a process of: receiving a billing request from a trusted service, wherein the billing request billing information to the wireless subscriber billing system; generating a validation response to the billing request in the wireless subscriber billing system; and communicating the validation response to the trusted service.

Another embodiment of the invention can include a method of processing multi-party billing events, in a wireless subscriber billing system, the method comprising: generating a billing event including a provider fee and payee, and at least one source fee and payee associated with a transaction; and processing the transaction to distribute payment to the provider payee and the at least one source payee.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION OF THE PREFERRED EMBODIMENTS

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One or more embodiments of the invention can be used in conjunction with a runtime environment (e.g., API) executing on the computing device. One such runtime environment is Binary Runtime Environment for Wireless software (BREW®) previously discussed. However, one or more embodiments of the invention can be used with other types of runtime environments or platforms that, for example, operate to control the execution of applications on wireless client computing devices.

Additionally, it will be recognized to those skilled in the art that an application file type being distributed and executed may be described herein for simplicity of description. However, an "application" may also include files having executable content, such as: object code, scripts, java file, a bookmark file (or PQA file), WML scripts, byte code, and perl scripts. In addition, an "application" referred to herein, may also include files that are not executable in nature, such as documents that may need to be opened or other data files that need to be accessed.

Figure 1:
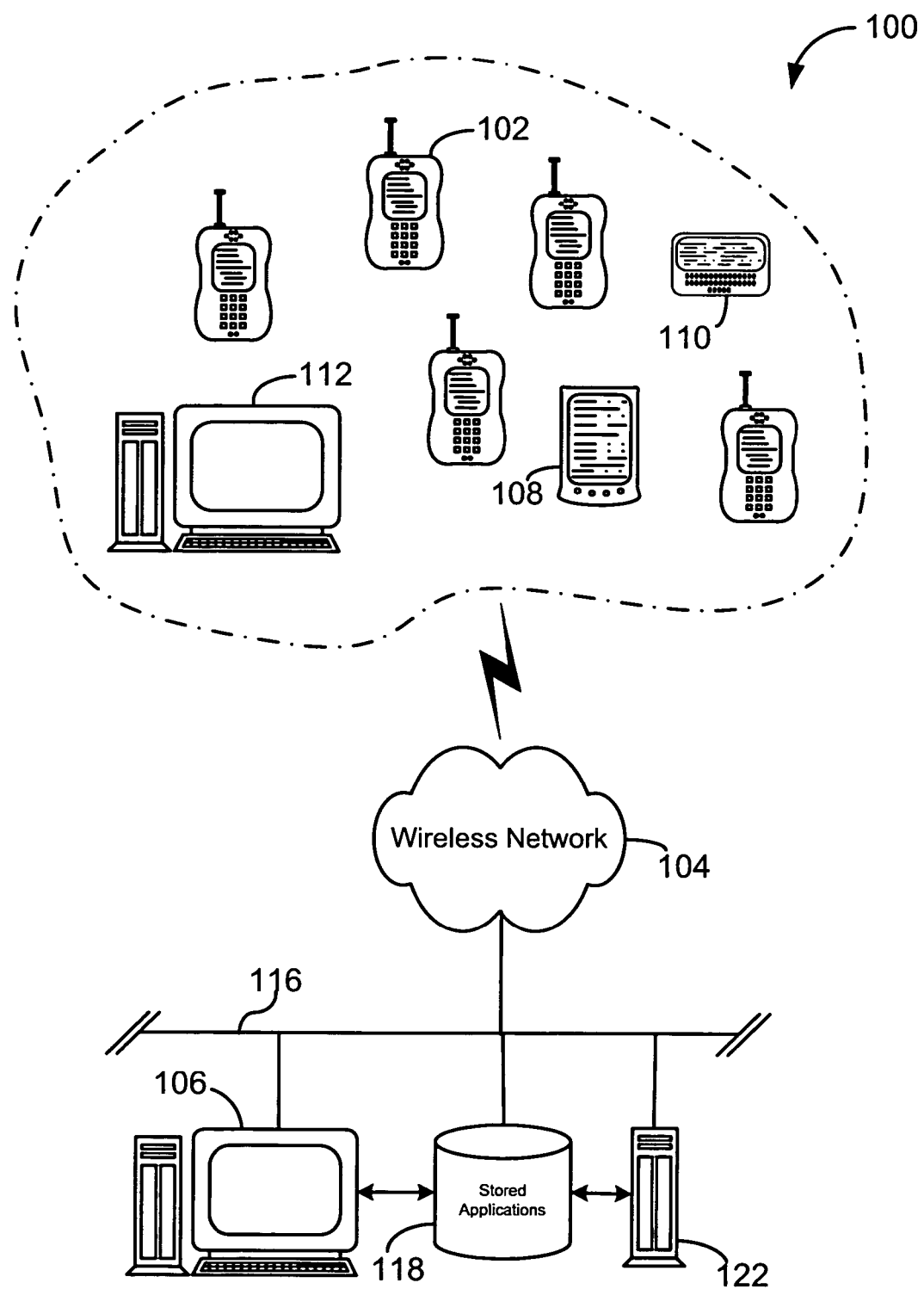
FIG. 1 is a diagram of a wireless network architecture that supports the client devices and servers in accordance with at least one embodiment of the invention.

FIG. 1 illustrates a block diagram of one exemplary embodiment of a wireless system 100 in accordance with at least one embodiment of the invention. System 100 can contain client devices, such as cellular telephone 102, in communication across a wireless network 104 with at least one application download server 106 that selectively transmits software applications and components to wireless devices across a wireless communication portal or other data access to the wireless network 104. As shown here, the wireless (client) device can be a cellular telephone 102, a personal digital assistant 108, a pager 110, which is shown here as a two-way text pager, or even a separate computer platform 112 that has a wireless communication portal. The embodiments of the invention can thus be realized on any form of client device including a wireless communication portal or having wireless communication capabilities, including without limitation, wireless modems, PCMCIA cards, personal computers, access terminals, telephones, or any combination or sub-combination thereof.

The application download server (ADS) 106 is shown here on a network 116 with other computer elements in communication with the wireless network 104. There can be a stand-alone server 122, and each server can provide separate services and processes to the client devices 102, 108, 110, 112 across the wireless network 104. There is preferably also at least one stored application database 118 that holds the software applications and content that is downloadable by the wireless devices 102, 108, 110, 112. However, those skilled in the art will appreciate that the configuration illustrated in FIG. 1 is merely exemplary. Accordingly, embodiments of the invention can include one or more servers that can each perform all the described functions and contain all necessary hardware and software, or can contain only selected functionality.

Figure 2:
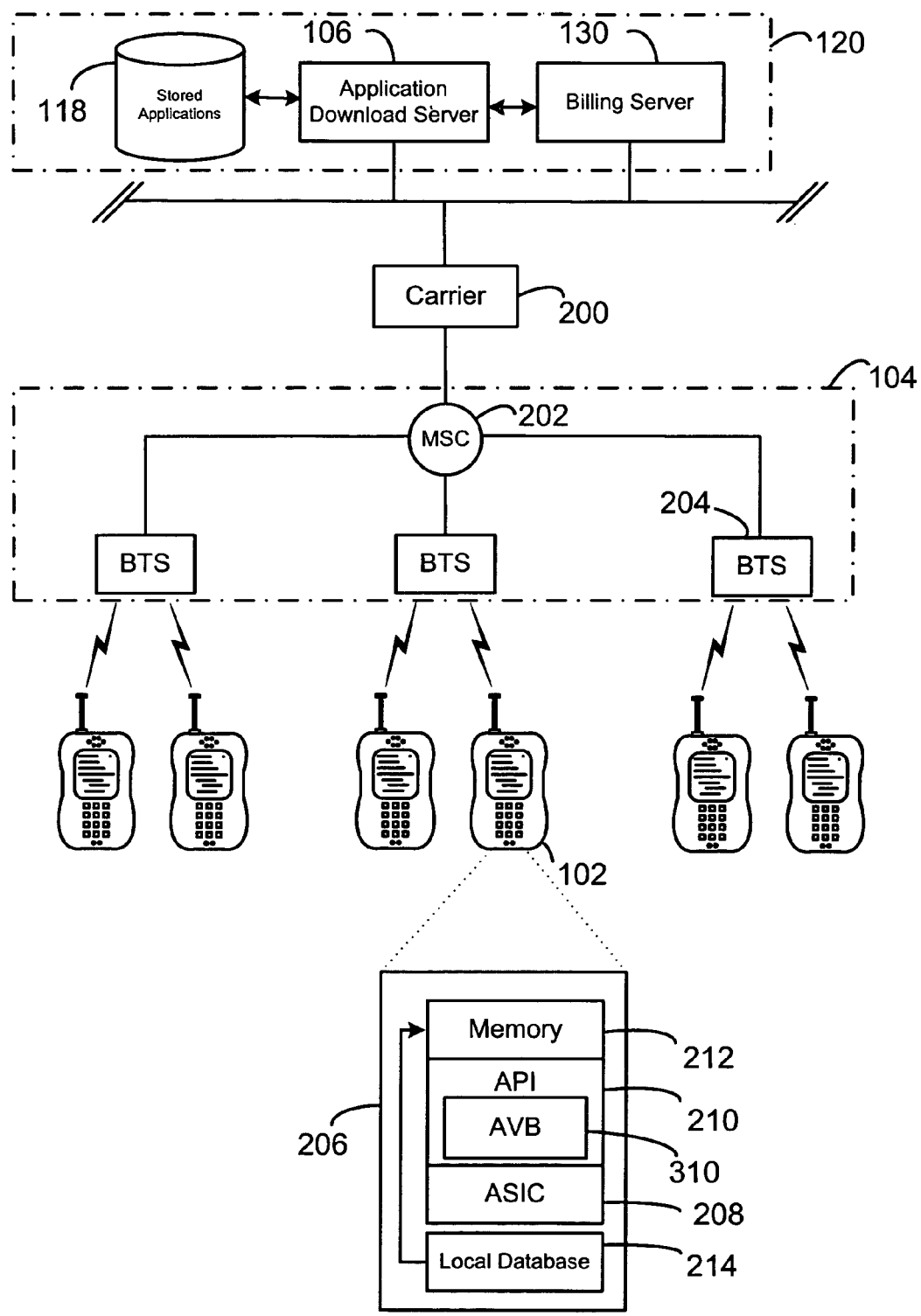
FIG. 2 is a more detailed diagram of a wireless network architecture that supports the client devices and servers in accordance with at least one embodiment of the invention.

In FIG. 2, a block diagram is shown that more fully illustrates system 100, including the components of the wireless network 104 and interrelation of the elements of the exemplary embodiments of the invention. System 100 is merely exemplary and can include any system that allows remote client devices, such as wireless client computing devices 102, 108, 110, 112 to communicate over-the-air between and among each other and/or between and among components connected via a wireless network 104, including, without limitation, wireless network carriers and/or servers. The application download server 106 and the stored application database 118, along with any other servers such as billing server 130 which are used to provide cellular telecommunication services, communicate with a carrier network 200, through a data link, such as the Internet, a secure LAN, WAN, or other network. In the embodiment shown, a server 120 can include the application download server 106, billing server 130 and the stored application database 118. However, these servers can also be independent devices.

The carrier network 200 controls messages (typically sent as data packets) sent to a messaging service controller ("MSC") 202. The carrier network 200 communicates with the MSC 202 by a network, the Internet and/or a public switched telephone network (PSTN). Typically, the network or Internet connection between the carrier network 200 and the MSC 202 transfers data, and the PSTN transfers voice information. The MSC 202 can be connected to multiple base stations ("BTS") 204. In a similar manner to the carrier network, the MSC 202 is typically connected to the BTS 204 by a network, the Internet and/or PSTN for data transfer and/or voice information. The BTS 204 can broadcast data messages wirelessly to the client devices, such as cellular telephone 102, by short messaging service ("SMS"), or other over-the-air (OTA) methods known in the art.

The client device, (here a wireless client computing device), such as cellular telephone 102, has a computer platform 206 that can receive and execute software applications or content and/or commands transmitted from the application download server 106, billing server 130 and/or server 120. The computer platform 206 can include an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The API 210 also includes an application-based value billing extension (AVB) 310 containing logic configured to process special billing requests from the client device to the carrier network 200. The computer platform 206 also includes a local database 214 that can hold applications not actively used in memory 212. The local database 214 is typically a flash memory cell, but can be any secondary storage device as known in the art, such as magnetic media, EEPROM, optical media, tape, soft or hard disk, or the like.

The wireless client computing device, such as cellular telephone 102, has installed on it, or otherwise downloads, one or more software applications, such as games, news, stock monitors, and the like. For example, the cellular telephone 102 may receive one or more software applications and content downloaded from the download server 106. The software applications and content may be stored on the local database 214 when not in use. The cellular telephone 102 or other wireless computing device may upload resident applications stored on the local database 214 to memory 212 for execution on the API 210 when so desired by the user or invoked by another API.

As used herein "client device", "wireless device" or "client computing device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to billing information communicated between a client device and a server. The client computing device can be serviced by at least one remote server with respect to processing the billing requests generated at the client device. Some examples of client devices which may be used in accordance with embodiments of the present invention include cellular telephones or other wireless communication units, PDAs, paging devices, handheld navigation devices, handheld gaming devices, music or video content download units, and other like wireless communication devices.

The wireless communication between the client device 102 and the BTS 204 can be based on different technologies, such as code division multiple access (CDMA), time division multiple access (TDMA), frequency division multiple access (FDMA), the global system for mobile communications (GSM), or other protocols that may be used in a wireless communications network or a data communications network. The data communication is typically between the client device 102, BTS 204, and MSC 202. The MSC 202 can be connected to multiple data networks such as the carrier network 200, PSTN, the Internet, a virtual private network, and the like, thus allowing the client device access to a broader communication network. As discussed in the foregoing, in addition to voice transmission, data can be transmitted to the client device via SMS or other OTA methods known in the art.

Figure 3:
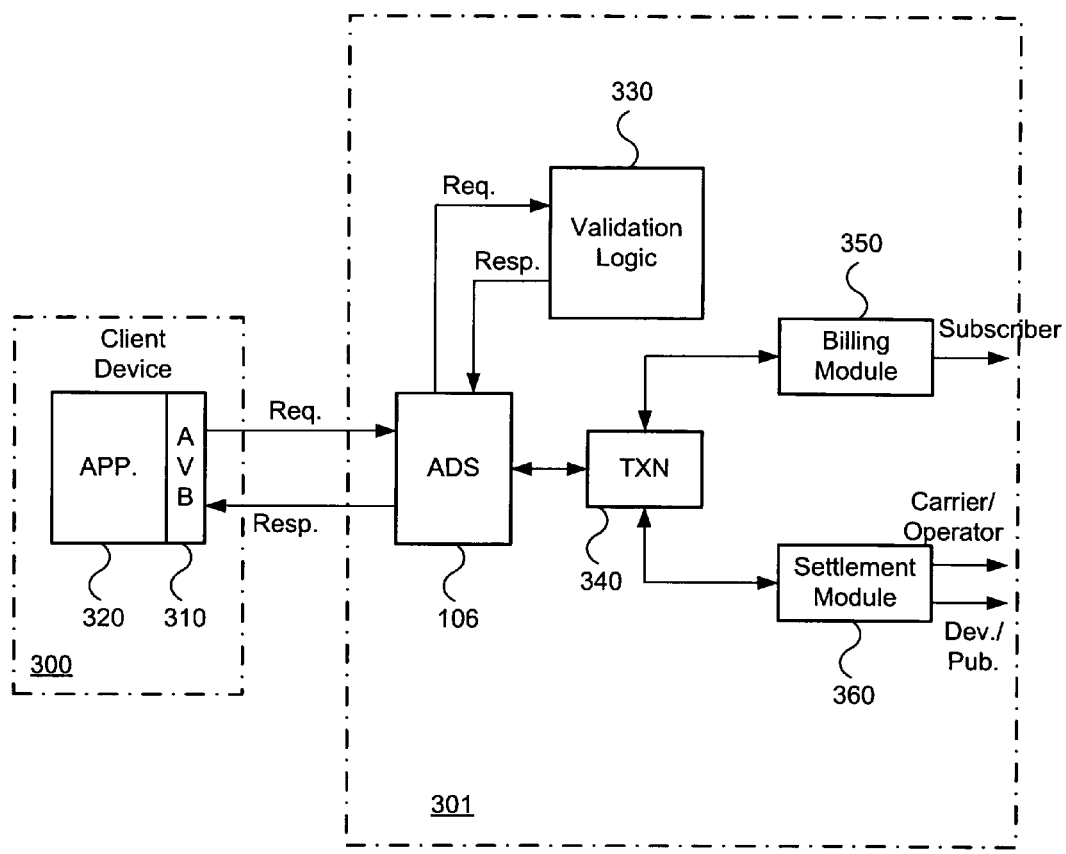
FIG. 3 is a system level illustration of an application value billing system in accordance with at least one embodiment of the invention.

Referring the FIG. 3, a client device 300 is illustrated that includes an application 320 (e.g., a BREW® application) that includes an AVB extension 310 (e.g., an API that enables billing requests and processing within the application). The billing request is generated within the application. This allows for the shopping experience to be controlled at the application level and for greater flexibility in the distribution and pricing of applications, features in applications and/or content. For example, a developer may wish to provide an arcade-type application, with various features each having different price levels. These features may be included with the original application (e.g., different levels of difficulty) or may be downloaded from a remote server (e.g., enhanced background music). The option to purchase each feature can be presented to the user and the user can determine whether or not to purchase additional features at the application level using the AVB extension 310. Accordingly, one application 320 can generate incremental billing for the developer and carrier for differentiated pricing, without the need of multiple applications and multiple downloads of the different applications. Also, because the additional services are enabled through the application, a network based application may dynamically configure the latest set of services available for incremental charges without having to redeploy a new application. An example of this would be a ringtone shopping application. Ringtones may be stored on a server and may be updated as the content server determines appropriate. The AVB application can access a remote directory of ringtones and pricing to display to the consumer in real-time. As such, the AVB API provides greater flexibility to developers and operators for data service offerings and pricing flexibilities.

In contrast, to achieve a similar functionality using conventional systems the application developer would have to generate different applications for each feature and/or pricing level and make them available for download. Conventional systems would treat each download as a one-time purchase and record the billing information and process the settlements for each application downloaded. This process is controlled by the carrier and to purchase each application the client device would have to connect to the carrier network to browse the application catalog and purchase the desired application with the desired features.

In embodiments of the invention, as stated above, the shopping experience is conducted at the client device 300. Accordingly, after a purchase option is presented and accepted at the client device 300, a billing request is generated within the client device 300. The billing request and other information used to process the billing transaction (e.g., subscriber identification information (SID), content provider(s), retail price, and the like) can be transmitted to a remote billing system 301. The billing request is received at the remote billing system 301 and processed. A validation response is generated in response to the billing request at the remote billing system 301. The validation response is transmitted to the client device 300.

The validation response can be an approval of the billing request or a denial of the billing request. Once the client device receives the response, it can process the validation accordingly. For example, the feature (e.g., an additional level in an arcade game) linked to the billing request can be activated, if the validation response is positive. Likewise, if the billing request is denied, an indication of the denial of the billing request can be displayed on the client device. Optionally, additional information can be included in the denial, such as the reason why the request was denied (e.g., insufficient funds).

In at least one embodiment, the billing system can leverage existing billing components to facilitate implementation of the system. For example, in FIG. 3, the application distribution system (ADS) 106 can receive the billing request from the client device 300. The ADS 106 can then access a validation logic 330 that can be determined by the billing entity (e.g., a carrier). The validation logic can be as detailed or as limited as desired. For example, a carrier may allow all billing events to be processed as long as the SID and a requested billing amount is valid and enough information is provided to generate a billing event (e.g., item ID, supplier ID, supplier pricing (e.g., price supplier is paid), and the like). This information can be included in the billing request directly or can be generated in combination with stored information in a server in the billing system. For example, an item ID can be linked to one or more supplier IDs and related supplier pricing, description of the item, consumer list price (CLP), and the like. However, typically the pricing information will be transmitted from the AVB 310, as the price displayed to the user during the client-based transaction that generates the billing request should be the price used for subscriber billing.

The ADS 106 can generate the additional billing information based on the item ID. Additionally, the ADS 106 can perform additional checks once the validation logic 330 approves the billing request. For example, if the client pricing plan is a prepay plan, the prepay balance can be checked to see if there is sufficient funds to purchase the item. If there are sufficient funds, then the approval is transmitted to the client device. However, if there are not sufficient funds, then the billing request is denied, even though the billing request is valid. Once the billing request is ultimately approved by the billing system 301, the approval is transmitted to the client device 300 for processing by the AVB 310 and application 320 that generated the billing request.

In addition to transmitting the approval, the ADS 106 communicates transaction data to transaction manager (TXN) 340. The TXN 340 is configured to receive the transaction data from the ADS 106. The TXN 340 can associate any further billing information not included with the transaction data. For example, the transaction data can contain the SID, the item ID, and a price ID. The TXN 340 can associate additional data to complete the billing process (e.g., supplier IDs and related supplier pricing, description of the item, full pricing plan, and the like). The TXN 340 then communicates this information as a billing event to a client billing module 350 and a settlement module 360. The client billing module 350 is configured to receive the billing event from the TXN 340 and to generate a bill to a subscriber associated with the client device 300. The settlement module 360 is also configured to receive the billing event from the TXN 340, to invoice the billing entity (e.g., carrier/operator), and to pay a supplier (e.g., developer, publisher and the like).

Typically, the billing event is created and processed in a conventional manner after the transaction data has been generated. For example, metadata associated with an item can be stored in the TXN 340 and/or related database. When the client device 300 receives approval for the billing request, transaction data can be sent to and stored in the database. The type of transaction can also be stored so that reports generated to the carrier and/or developers can identify the transaction as an AVB generated billing event. The transaction data may also include a subset of the metadata and additional information included by other devices and/or systems. Billing events are created in the TXN 340 by correlating the metadata and the raw transaction data. A more detailed description of this process is found in commonly owned U.S. patent application Ser. No. 10/222,706, entitled "Transaction Processing", which is incorporated herein by reference in its entirety.

The conventional process for purchasing and obtaining applications for a client device includes the client device accessing a catalog of available applications, selecting a desired application and downloading the application to the client device. This process generates a billing event related to the application download that ultimately results in the billing of the subscriber and payment of the application developer, as discussed in the background. However, the marketing and purchasing of applications and utilization of the wireless subscriber billing system has been limited to this client-server connection.

Figure 4:
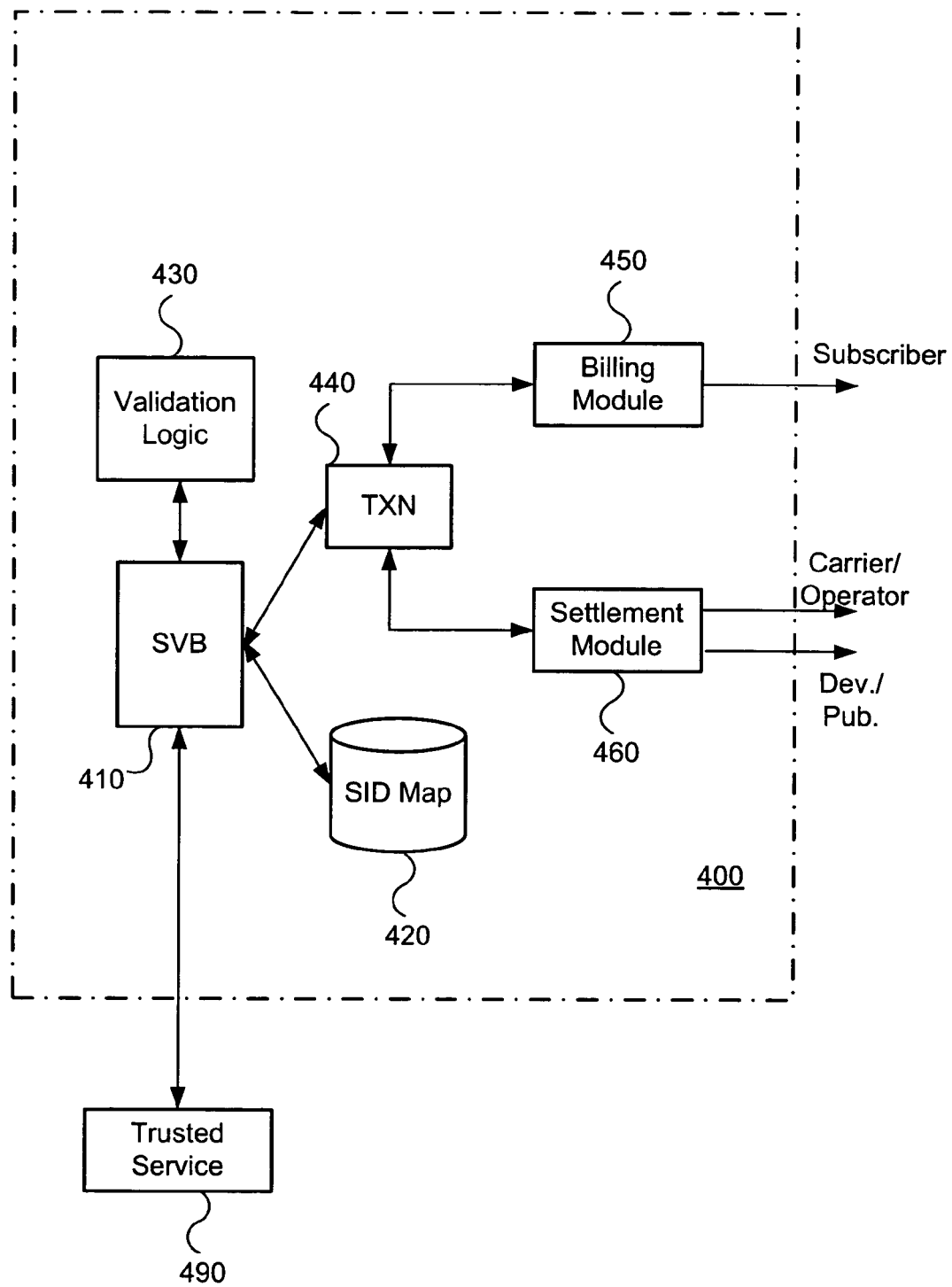
FIG. 4 is a system level illustration of a service value billing system in accordance with at least one embodiment of the invention.

FIG. 4 illustrates a system in accordance with at least one embodiment of the invention that allows for additional service value billing. A service value billing (SVB) module 410 can be included in a wireless subscriber billing system 400. The SVB 410 provides a billing portal for a trusted service 490 (e.g., third-party vendor, publisher, and the like) that are not part of the carrier network. The SVB 410 allows the trusted service 490 to generate billing requests that are then processed through the billing system 400. In contrast to the conventional system that distributes and bills for applications directly selected from and downloaded to a client device, the SVB allows for non-application related transactions to be processed through the established wireless subscriber billing system 400.

An authentication feature can be included in the SVB module 410 that can verify the identity of the trusted service 490 that is accessing the SVB module 410. For example, a digital certificate can be issued to the trusted service. The certificate will be associated with the carrier/operator and the trusted service (e.g., content payee) for validation. The trusted service 490 can digitally sign each transaction to the SVB module 410 using the issued certificate. The digital signature and the digital certificate can be included in each request. The SVB module then authenticates the signature on each billing request. The SVB 410 can be a web-based interface and the connection to the SVB 410 can be via the internet using an HTTPS protocol in the trusted service 490 authentication, for example. However, those skilled in the art will appreciate that the invention is not limited to an internet connection and an HTTPS protocol and any combination of wired and/or wireless connection and suitable security/authentication system can be used to communicate the billing requests from the trusted service.

Accordingly, the wireless subscriber billing system 400 can receive a billing request from a trusted service external to the billing system 400. The billing request can include billing information that is communicated to the billing system 400 and used to validate the request at the billing system 400. Further, the billing system 400 can generate a validation response to the billing request and communicate the validation response to the trusted service 490. The billing information can include information used to validate the billing request including a subscriber ID, provider/content payee, a content (item) ID, list price, billing description, and the like. However, those skilled in the art will appreciate that other data can be included in the billing request.

For example, in the configuration illustrated in FIG. 4, a billing request can be generated by trusted service 490. The SVB 410 can receive the billing request from the trusted service 490 and can authenticate the trusted service 490, as discussed herein. Validation logic 430 can validate the billing request. Using the validation logic 430, the carrier can perform billing integrity checks to determine if the carrier wants to accept the billing request for further processing or reject the request. Since the carrier is not controlling the pricing and transaction but will be billing the subscriber, the validation logic 430 can be used as an intervention point to allow the carrier to determine which billing requests are acceptable. If the billing request is validated, SVB 410 can generate transaction data based on the billing request and communicate the transaction data to transaction manager 440. The transaction manager 440 can receive the transaction data from the SVB 410 and generate a billing event which can be communicated to a billing module 450 and a settlement module 460. The billing module 450 can receive a billing event from the transaction manager 440 and generate a bill to the subscriber. The settlement module 460 can receive the billing event from the transaction manager 440, invoice a carrier, and pay a content provider (e.g., source of application/content/service billed for), as discussed above. Accordingly, the SVB 410 can be used to bill and settle a transaction external to the billing system 400 and the use of the wireless subscriber billing system 400 is not limited to billing and settling application downloads and/or carrier related services.

Since the SVB-based billing events from the trusted service are not directly generated within the carrier network or from the subscriber's client device, an SID map database 420 can be used by SVB to uniquely identify the subscriber. For example, a subscriber could use their Mobile Directory (dialable) Number (MDN) or other assigned unique number known by the carrier at the trusted service 490. The MDN (or other unique number) can be transmitted with the billing request as the SID to the SVB 410. The SVB 410 can then access the SID map database 420 and replace the MDN or associate the MDN with the unique SID used in the billing system for processing the billing requests and transactions.

Additionally, the item purchased/billed for item may not be an application or content distributed through the ADS and/or carrier network. Accordingly, the billing request can include additional information regarding the item description, retail price, purchase time/date, and the like. However, at least a portion of this additional information may also be pre-loaded into a database and accessed based on the item ID and/or provider/payee ID (e.g., trusted source).

The information included in the billing request can include a variety of data used for billing and tracking transactions. For example, the information included in the billing request can include Item ID which can be specified by the trusted service to represent a unique identifier for item (e.g., application, content, article, and/or service) purchased at the trusted service. It can be considered a billing part number for the item. However, since there is no guarantee that the Item ID is unique across trusted services, it can be referenced with the Provider/Payee ID (which can be the Trusted Service) to maintain uniqueness. A Customer ID can be an operator's Subscriber ID (SID) or other unique ID that can be related to the operator/carrier's SID. A Customer ID Type can be included (e.g., SID, MDN) in the billing information. A Signature can be a concatenated string of all of the data digitally signed by the trusted service, using the private key of the issued digital certificate. The Digital Certificate from the trusted service key pair can be used for the SVB to authenticate the request. A Payee ID can represent the provider/content payee to be paid the content portion of the standard revenue share split (e.g., revenue split between carrier, settlement entity, and content provider) and can equate to a publisher/developer/manufacturer for the item. In many situations, the payee ID is the trusted service.

A Greenwich Mean Time (GMT) stamp for the purchase can be included. A GMT Offset can be included that represents the offset to compute the local time. A Client Trans ID can represent a unique identifier for the billing/transaction request. It can be used to check that this transaction has not already been received (duplicate check to prevent double billing). Carrier ID represents a sub-operator ID in the system (e.g., it can equate to a BREW® Carrier ID and Primary Carrier). A Pre-pay Flag can indicate if the end user is a pre-pay customer for the operator. A Retail Price can represent the consumer charge of the content bill event. A Content Fee can represent the value used to determine the content payee payment according to pricing terms. In most cases it is the same as Retail Price. Currency code can represent the currency of the list price, content fee and source fee amounts specified in the transaction. A Billing Description can represent a short description of the content item which can be included in the report sent to carriers (e.g. a billing XML feed) and the report available to developers (e.g., a developer XML feed) and appear on the consumer billing statement. It equates to the billing part name for this item. A Long Description can represent a longer name of the value bill content which can be used to further describe the transaction (e.g. for customer service), but is typically not included in the Billing Extract XML or the Developer Extract XML (i.e., report to developers). Vendor data can represent additional data to be used by the trusted service as passed with the billing transaction. Vendor data can be included in the billing and developer reports. Information for a start recurring billing interface can include Start Bill Date which can indicate the day (e.g., in MM/DD/YYYY format) to trigger subscription billing. If the Start Bill Date is in the future, then the first value billing (IB) event to trigger billing is not created until the start bill date. An End Bill Date can indicate the end date, (e.g., in MM/DD/YYYY format) of the subscription. No IB events are created after the end bill date.

The foregoing description of optional billing information that can be included in the billing request and/or associated with the billing event was provided solely for illustration. Billing requests can be processed without all the information described above and likewise additional information not listed could be added for the purposes of tracking and reporting billing events. Accordingly, those skilled in the art will appreciate the billing request and associated information to generate a billing event can be varied as desired by the carriers and providers of the purchased items.

Using the SVB 410, the billing system 400 is essentially functioning as a "pass-through" billing service from the trusted service 490 (i.e., an authorized source for billing generation). The trusted service 490 can be responsible for service value billing transaction management which can include: creating the transaction (e.g., SOAP (Simple Object Access Protocol) interface), providing security, setting valid transaction attributes (e.g., billing information describe above), submitting the transaction to the billing system 400, processing the response from the billing system 400 and re-submitting the transaction, as required. The trusted service 490 can provide authentication for each transaction (e.g., digitally sign each transaction) to the SVB 410 using the digital certificate issued by the operator or other secured transaction processing. The SVB 410 can then authenticate the requests from the trusted service 490, validate the requests, support value billing operator interfaces and communicate valid requests (e.g., transaction data) to the TXN 440. The SVB 410 can return an error code to identify invalid requests. The TXN 440 can support a duplicate event check, the conversion processing of the billing transactions, the mapping and processing of recurring content value billing and can communicate the value billing events to billing module 450 and settlement module 460.

The SVB 410 can support multiple operator interfaces. For example, a user authorization interface can be used to verify the SID is authorized for the SVB service. A transaction validation interface (e.g., validation logic 430) can be used for the operator to implement additional verification of billing information (i.e., content fee not to exceed X, Customer ID valid, etc.). A pre-pay interface can used to initiate pre-pay authorization (e.g., check pre-pay balance) and debit services for value billing services. These interfaces may be realized as separate modules or may all be included in a common logic module (e.g., validation logic 430).

Application purchasing in conventional wireless systems is controlled by the carrier/operator and is typically based on a client device browsing for applications (e.g., as presented by the ADS), selecting and downloading the application from the carrier network, as discussed above. The transaction can be recorded, billed and settled as discussed in the background and foregoing disclosure.

Figure 5:
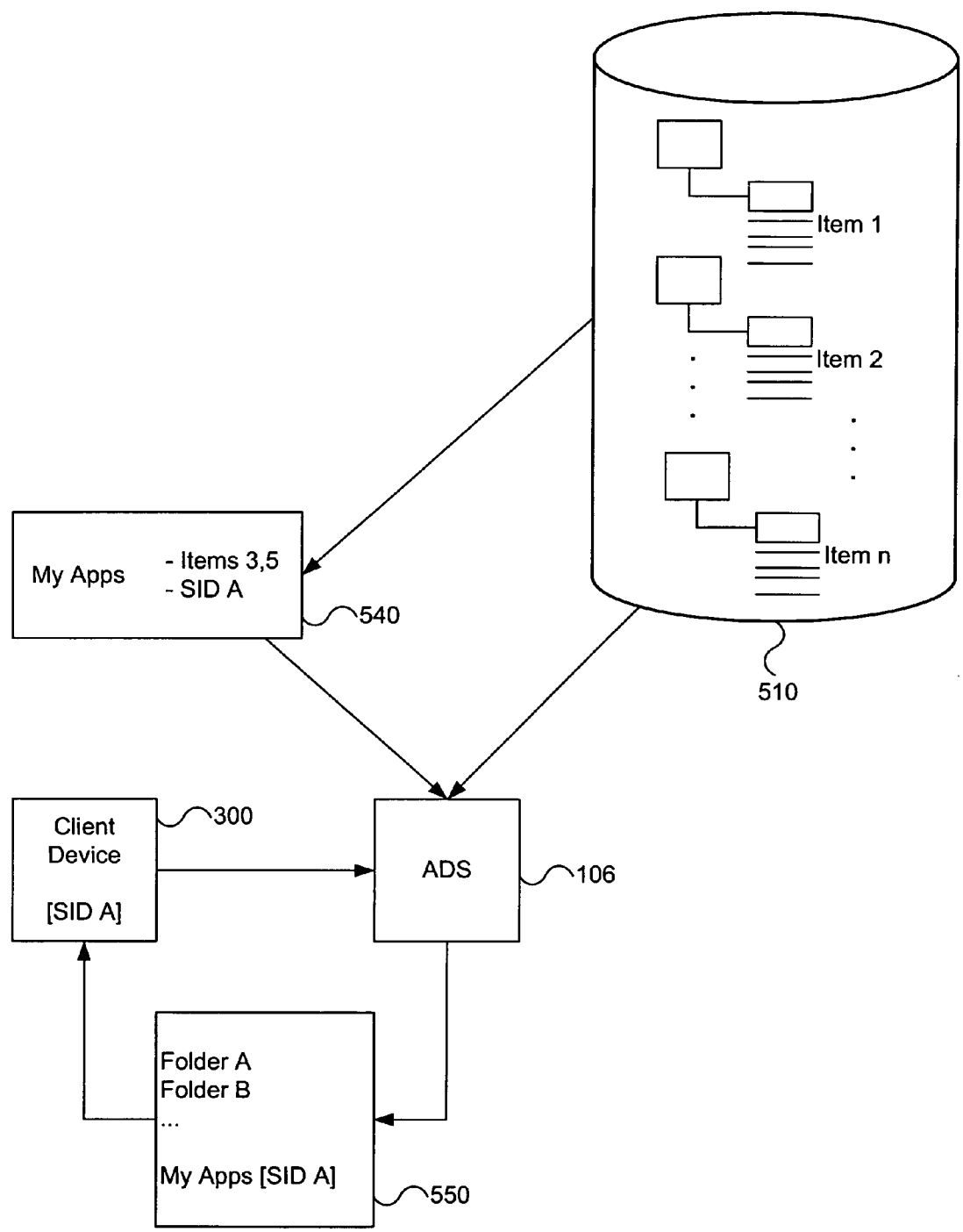
FIG. 5 is a system level illustration of an group distribution system in accordance with at least one embodiment of the invention.
Figure 6:
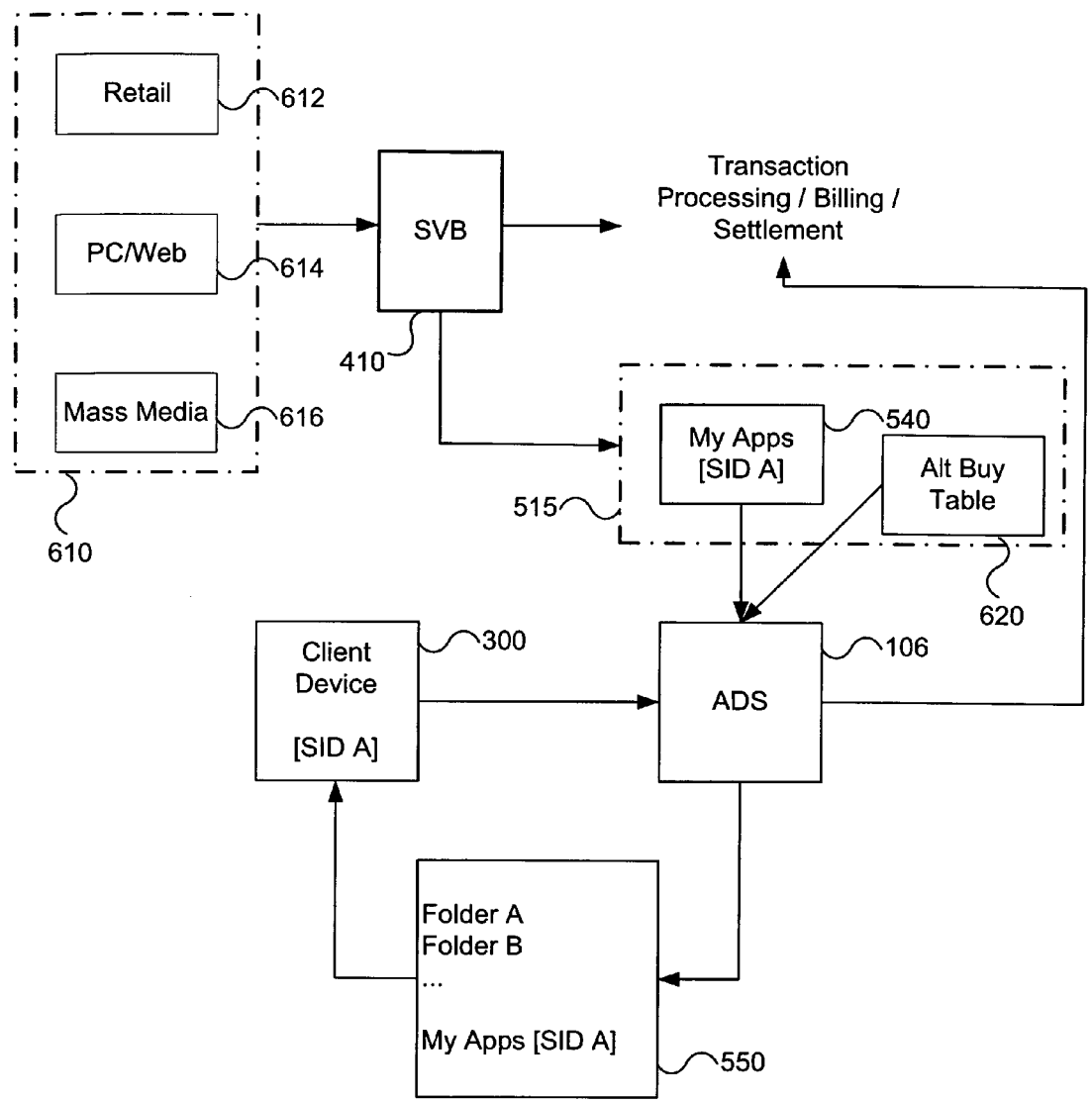
FIG. 6 is a system level illustration of an alternated buy process including system elements in accordance with at least one embodiment of the invention.

However, the addition of the SVB service in the billing system allows for alternate buy (Alt Buy) sources in addition to the direct purchase from the carrier network. Referring to FIG. 5, a SID-directed (or client device directed) distribution structure can allow for directed delivery of items (e.g., applications, content, etc.) to a remote client device. This SID-directed structure allows for applications and/or content purchased from a carrier offline to be associated with a SID so that the application/content purchased is available for download from the client device and the download event will not generate any additional billing to the subscriber, as in the conventional download process.

For example, a main catalog 510 can contain a plurality of items (e.g., applications, content, services and the like) available for purchase from the carrier/operator. A SID-directed group 540 that contains only one SID (e.g., a My Apps group) can be formed that contains items that are specifically directed to that SID (client device). Accordingly, a shopping catalog 550 can be generated for a client device 300 from a main catalog 510 based on platform ID, runtime API, and language, in a conventional manner (e.g., using folders/items from main catalog 510). However, the shopping catalog 550 can be augmented by the SID-directed group 540 and items (e.g., My Apps) associated with a SID in the shopping catalog 550 based on the SID associated with the client device 300. Therefore, the shopping catalog 550 can be customizable for each SID and the SID-directed group 540 can be used to deliver items purchased via Alt Buy.

In addition to presenting items in separate groups, differentiated pricing can be used for the same item. For example, item 5 (e.g., an application) in the main catalog 510 may be offered for a full commercial price of $10.00. However, the same item 5 can be contained in a SID-directed group 540 (e.g., My Apps) which may be offered for free. For example, item 5 may have been purchased via Alt Buy or be a gift from another subscriber. Accordingly, the purchase/billing/settlement process can be separated from the delivery of the item purchased unlike the conventional download initiated billing event.

An external billing channel (e.g., SVB 410) to the wireless subscriber billing system allows for external purchase transactions to be processed via the wireless subscriber billing system. Some purchases can be processed without any associated download or enhancement to the client device, such as purchasing tickets to a movie. However, other types of external transactions can be processed that include purchasing items from a carrier catalog (e.g., downloading or enhancing features of an application, application purchase, ringtone purchase, and the like) directed to a client device on the wireless system. In general this type transaction that is directed to a client device but is not generated within the conventional client device to server transaction in the carrier network by the client device is referred to as an "alternate buy" or "Alt Buy", in the following description.

An Alt Buy zone 610 can include various channels, such as Retail 612 (e.g., operator/third-party retail cards, kiosk), PC/Web based 614 (e.g., operator/third-party web site or directly from within a PC application, such as game in which a purchase can be made for a related game for the wireless client 300), Mass media 616 (e.g., Advertising Links, and the like). The Alt Buy can leverage the SVB 410 for billing and SID based group functions (e.g., My Apps 540) for delivery of the content/application to the client device 300 associated with the SID.

For example, retail cards can be a card sold in either an operator's or third-party's retail outlet that provides a subscriber with one or more applications. The purchaser may use the card himself or gift the card to another subscriber. The purchase of multiple applications on a single card can contain a discount in the purchase price of the applications. After purchase or receipt of the gift, the subscriber can register the card, at which point the applications (e.g., BREW® applications) are loaded into their SID-directed group (e.g., My Apps directory) for download or auto-installation. Further, the transaction processing is completed to bill subscriber (optional if not prepaid) and settles with all application and service providers.

Operator/third-party web offerings can be presented that mimic the catalog offerings and possibly incorporate some discount pricing for purchase of multiple applications or for purchase of certain offerings during limited time offerings. Web site Alt Buys can offer applications and content individually, or offer bundles of product and service items. For example, the subscriber (or gift giver) can provide information regarding the destination subscriber's device (e.g., MDN) and the operator/third-party (i.e., trusted service) provides information for subscriber billing and content provider payment via the SVB 410 interface.

Operator or third-party kiosks can have application purchasing capability that mimics the main catalog offerings and possibly incorporates some discount pricing for purchase of multiple applications or for purchase of certain applications during limited time offerings. The subscriber provides information on the destination subscriber's device (e.g., client device 300) and the operator or third-party directs distribution (e.g., via My Apps) of the purchased applications to that device and provides information for subscriber billing and content and service provider payments.

Advertising Links can offer applications to an operator's subscribers. For example, these can be non-billable to the subscriber. The subscriber provides information on the destination subscriber's device and the operator or third-party directs distribution of the applications to that device (e.g., via My Apps) for user download.

As discussed in the foregoing, the Alt Buy offers a variety of different channels to purchase and deliver applications/content to subscribers. In each of these configurations, the billing and delivery information is communicated to the SVB 410 and group manager 515 to allow for proper delivery and billing. Accordingly, billing and delivery metadata can be transmitted as part of the billing request communicated to the SVB 410.

For example, an application can be purchased outside the carrier network/billing system (e.g., cash, credit card at an operator kiosk). A billing and distribution request is communicated from the trusted service (e.g., Alt Buy zone 610) to the SVB 410. A special price handle can be included with the billing request that indicates the transaction is alternate buy and has a special pricing base (e.g., CLP=0 so that the subscriber is not billed). The SID is used to target delivery (e.g., My Apps). Generally, the Alt Buy service formats and submits billing and distribution requests, processes return event information, and processes error instances. The billing/distribution request can be a SVB transaction and the distribution request can be a group manager directed (SID-directed) application request. The metadata (information) included with the request includes, for example, Distribution SID, Item ID, Price Handle, Price Method, Price Basis, Price Value, Vendor Data, and Source Type for each application associated with the Alt Buy.

An Alt Buy delivery table 620 can be populated with data from the metadata passed from the Alt Buy source (e.g., 610). For example, the table can include SID (e.g., the distribution SID), Item ID, Usage, Price Handler, CLP fields. In the scenario described above, where the application was paid for at the Alt Buy zone 610 and the CLP=0, this information can be associated with the SID and the item ID and associated with the SID-directed group 540 (e.g., My Apps). When a client device 300 associated with the SID, accesses the SID-directed ("My Apps") group from shopping catalog 550 generated by the ADS 106, one of the items (e.g., an application) presented can be an item, which was purchased via an Alt Buy.

The ADS 106 can access the Alt Buy table 620 for and determine if there is an Alt Buy price handle associated with the SID and Item ID. The ADS can then replace the provided price handle associated with the Item ID with the local price handle from the Alt Buy table 620. Assuming the price is zero, the presentation of $0.00 or "Free" (or other language specific indication) can be displayed at the client device 300. If there is a local price handle, ADS 106 can identify the transaction as an Alt Buy transaction to ensure operator and developer minimums do not apply, consumer billing is not applied and developer/content provider settlement is not processed or processed at zero value. The ADS 106 can process the download request and generate transaction data at a zero value and pass the transaction data to the transaction processing, billing and settlement modules, as discussed above. However, both the billing and settlement will be zero (CLP=0, DAP=0, where the DAP is the payment to the developer/content provider), as the billing and settlement was performed at the Alt Buy zone via SVB. However, the other information related to the transaction can be maintained on this download event, in order to populate the operator and/or developer reports. For example, the information can be useful in tracking of the actual applications downloaded, download dates, and the like and can be associated with a SID and client device for marketing and/customer service.

In another exemplary embodiment, an Alt Buy purchase can be made from an operator kiosk for a one time or limited number of downloads for a special price (e.g., a low cost or zero cost promotion). As discussed above, an Alt Buy delivery table 620 can be initially set to allow the client device associated with the SID to download the application at the special pricing (e.g., CLP=0). The special pricing handle and price level is propagated through the billing system as discussed in the foregoing. However, in addition to the pricing, item ID and other data in the Alt Buy delivery table 620, a download indicator can be stored. Accordingly, once the item is downloaded (e.g., via ADS 106), the item ID licensing is delivered to the SID and the status of that license is set to a state of delivered. A record is kept for each downloadable license available for the item ID. When the item ID licensing is delivered to the SID the status of that license is set to a state of delivered. Accordingly, the download indicator/delivery status indicates that the item has been delivered and can be removed from the Alt Buy delivery table 620 (or functionally removed via a logic check to the download indicator field). Likewise, the item may not be visible from the SID-directed (My Apps) group 540. Accordingly, in either case if the item is downloaded again, it may be offered at the standard price level defined in the main catalog 510. Therefore, standard commercial item pricing can be intermingled with Alt Buy pricing, in the wireless billing system to allow for additional flexibility in promoting and marketing applications, content and/or services.

In the Alt Buy scenario, billing and distribution information can be generated in the Alt Buy zone 610 (e.g., at an operator kiosk). The billing and distribution information is communicated to the SVB 410 and the group manager 515. At least a portion of the information (metadata) can be passed along and stored through the billing and download transactions to allow the system to relate the transactions to a single Alt Buy transaction ID. For example, transaction metadata can be generated and carried with the SVB transaction. This metadata can be associated and stored with the item ID added to the SID-directed group 540, using, for example, group manager 515, ADS 106 or other server or logic. The metadata can be passed to the client device on a download request. Further, the metadata can be included in a mediated usage record by the transaction manager TXN.

The Alt Buy transaction may generate multiple transaction data at the TXN (e.g., first transaction data associated with the SVB billing request and second transaction data associated with the actual delivery (e.g., push/pull) of the content to the client device. Accordingly, a tracking ID can be used throughout the transaction processing so that the end-to-end tracking of the related transactions can be accomplished. Thus, the tracking ID can be included with the Alt Buy billing request and first transaction data can be generated based on the billing request. The transaction data can be processed through the billing system (e.g., TXN, billing and settlement modules) to generate a subscriber bill, distribute payment to a provider of the item, and/or transmit reporting data based on the first transaction data. The first transaction data including the tracking ID can be stored in a database for later retrieval, adjustments, customer service, and the like.

As discussed above, the delivery of the content in an Alt Buy transaction can occur separately from the billing request or not at all (e.g., if no content is delivered). Accordingly, if content is to be delivered, the content can be added from the main catalog to a SID-directed group associated with a client device. The tracking ID can also be associated with the content in the SID-directed group. When the content from the SID-directed group is downloaded to the client device, the tracking ID can also be passed to the client device. Likewise, second transaction data can be generated on the download of the content including the tracking ID and processed through the remaining billing, settlement and/or reporting process, as previously discussed. The second transaction data including the tracking ID can also be stored for later retrieval, adjustments, customer service, and the like. Accordingly, the Alt Buy transaction can be mapped and managed end-to-end (i.e., from the Alt Buy sale to the application download and transaction billing and settlement). Being able to track these transactions end-to-end, allows for increased business intelligence and application distribution penetration for Alt Buy sales channels. For example, with use of the tracking ID the carrier can derive how many Alt Buy downloads were exercised against the applications/content purchased. This is accomplished through the TXN mediationlconversion process for Alt Buy related downloads. TXN can use the local price handle to include conversion of the tracking ID in the mediated usage record. The tracking ID is used to correlate download events with SYB billing events. Because the tracking ID is included in the mediated usage record it can also be included in the billing report which can be integrated into carrier billing and data warehousing solutions.

Figure 7:
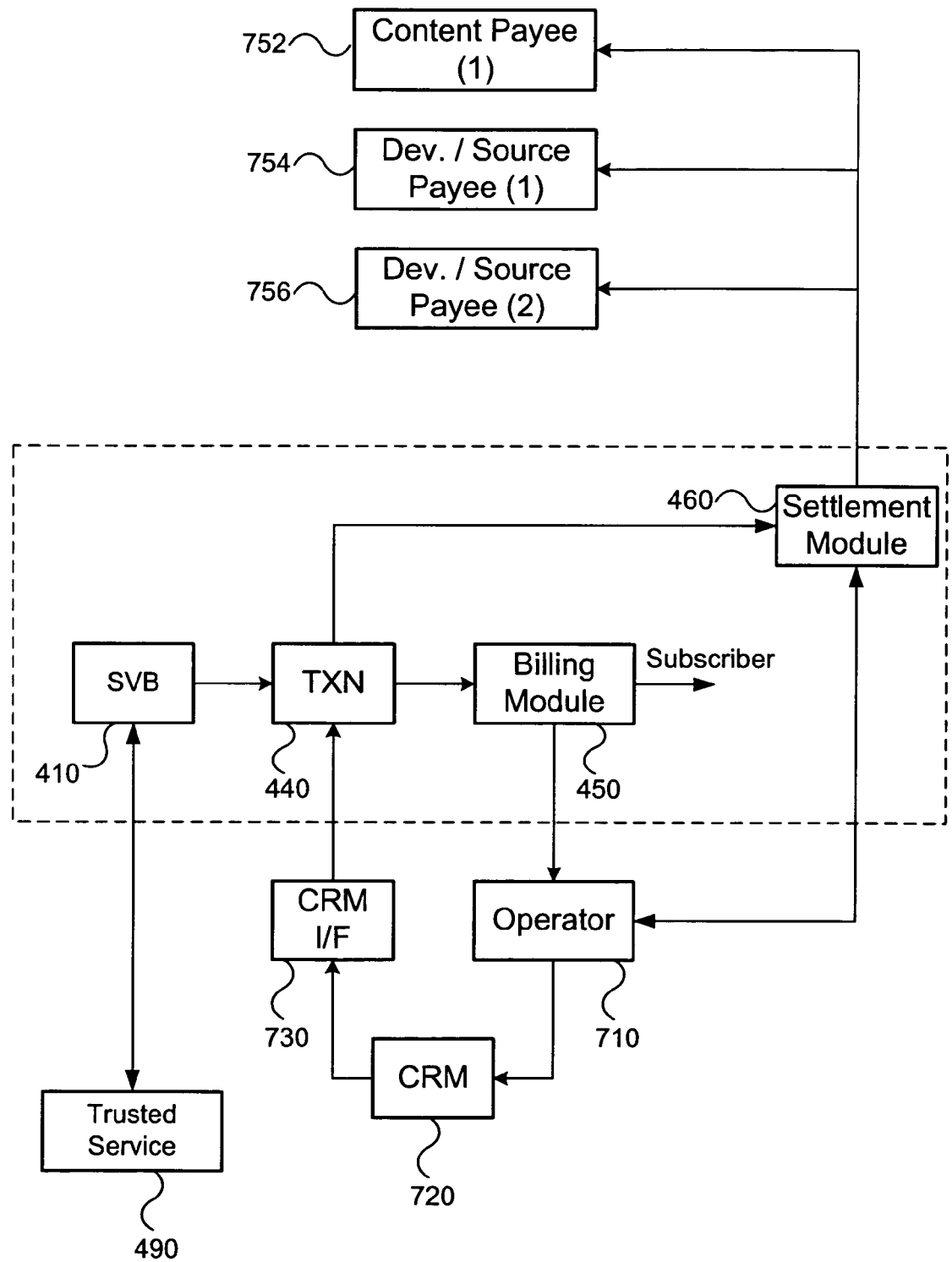
FIG. 7 is a system level illustration of a multi-party settlement and CRM system in accordance with at least one embodiment of the invention.

In another embodiment of the invention, the transaction may include multiple developers/publishers/vendors/sources (752, 754, 756), as illustrated in FIG. 7. For example, in the Alt Buy scenario applications may be bundled and sold in a common transaction (e.g., a retail game pack). As can be appreciated from the foregoing disclosure, SVB is used for the billing transactions and group distribution is used to distribute the content billed for. Accordingly, the SVB 410 can be configured to specify payment settlements based on multiple third-party source payees 754, 756, which may be the source content providers, with a source description and a source fee associated with each source payee 754, 756. The source payee(s) 754, 756 can get paid in addition to the developer and/or content payee 752. In other words, the content payee 752 can be paid a content portion of the revenue share split (which may be 100% of the content fee). The source payee(s) payment is processed out of the content fee (i.e. typically source fees are not in addition to content fees). Further, a source payee 754, 756 can be a developer, a publisher or other content provider. For example, in the application bundle context, the source payees 754, 756 can be the individual developers that have developed the applications included in the bundle. The content fee can be the sum of the fees negotiated with each developer plus additional fees for the content payee 752 (e.g., bundler/distributor). The multi-party settlement (e.g., payment distribution) can be implemented as source payee extension settlement events. SVB 410 can support payments to the known content payee 752 and any of its authorized multi-party source payees 754, 756.

Accordingly, for multi-party settlements additional source payee 754, 756 information can be included in the billing request generated in the billing system or by the Alt Buy source. For example, at least one source payee ID can be included. The source payee ID can represent a third-party payee (source payee) that supplied at least part of the content. The third-party payee is paid some portion of the content payee 752 payment. A source description can be included that represents a short description of the content provided by the source payee 754, 756. A source fee can be provided for each Source Payee ID that represents the third-party payee portion of the content payee payment. This additional information can be included with the billing metadata that is passed with the transaction. Therefore, the wireless subscriber billing system can be further leveraged to automatically bill and settled a single transaction including multiple third-party content providers/sources.

For example, in processing multi-party billing events in a wireless subscriber billing system, a billing event is generated (e.g., based on a request from trusted service 490) including a content payee 752, a content fee and at least one source payee 754, 756 and source fee associated with a transaction. The transaction is processed to distribute payment (e.g., via settlement module 460) to the content payee 752 and the at least one source payee 754, 756. The transaction data related to the payment of the content payee 752 and the at least one source payee 754, 756 is stored (e.g., at TXN 440 or other database operably coupled to the billing system) for later processing (e.g., customer service, billing adjustments, sales/marketing data mining, and the like). As discussed above, the content fee is greater than or equal to the sum of the source fees. Further, in addition to storing the transaction data at least a portion of that data can be transmitted (e.g., by settlement module 460) as transaction reporting data to the content payee 752 and/or each source payee 754, 756. For example, a developer may wish to track application sales related to bundling using the transaction reporting data sent from the billing and distribution system. Also, as discussed above, the billing event will typically lead to a subscriber bill (e.g., via billing module 450) being generated based on a retail price (e.g., CLP) for the content delivery or scheduled to be delivered. The retail price is typically greater than or equal to the content fee.

Once the transaction data has been stored, it can be used for a variety of purposes as discussed above. One such use is in customer relationship management (CRM) services. As illustrated in FIG. 7, an operator 710 receives billing information from billing module 450 and settlement module 460 (e.g., invoice for content and source payees 754, 756 portion of content fee). Accordingly, the operator 710 will have this information available for the CRM purposes. Assume that a subscriber was not happy with an application bundle purchased through the operator's retail outlet. Since this type of transaction (purchase of the application bundle) typically has multiple developers of the applications included in the bundle, multi-party settlement would have been used in the settling of the bundle purchase transaction. Now, assume that the CRM call center or manager 720 determines that the price paid should be adjusted by twenty percent for the purchase price. A CRM interface 730 to the billing system can access the stored transaction data and generate an adjustment transaction that contains a negative content fee and at least one negative source fee based on the stored transaction data. For partial adjustments the system will adjust all multi-party settlement source payees proportionally.

Accordingly, using the SID, transaction tracking ID and the like, the transaction data associated with the bundle purchase can be accessed. The negative content fee and at least one negative source fee can be based on an adjustment percentage and the stored transaction data related to the payment of the content payee 752 and the at least one source payee 754, 756. For example, the CRM interface 730 can receive an adjustment amount or percentage (e.g., −20%) from CRM 720. The CRM interface 730 can access the original transaction data, then generate a negative payment (e.g., 20% of the content fee and source fee) for the content payee 752 and each source payee 754, 756. The adjustment percentage is not limited, but can for example range from one to one-hundred percent (i.e., a complete refund). Further, a subscriber credit can also be generated based on the adjustment percentage and the list price for the content. Accordingly, a twenty percent refund to the subscriber can result in each payee in the original purchase (e.g., carrier/operator 710, content payee 752, source payee(s) 754, 756) receiving a proportional twenty percent debit. This can be accomplished by CRM interface 730 generating a negative billing event, which will then be passed through the billing system and settled in a similar manner to the billing events discussed in the foregoing description. Thus, the CRM interface 730 of the multiparty settlement system allows for the automatic adjustment of any multiple third-party transactions settled through the wireless subscriber billing system. Once again, the adjustment transaction data can be stored and/or used to generate reporting data to the operator 710, content payee 752 and/or source payee(s) 754, 756.

Although the foregoing example and related FIG. 7, discusses multiparty settlement and CRM service in relation to an SVB purchase, embodiments of the invention are not limited to this configuration. Any transaction (e.g., an application download from the client device) that included multiple parties that provide the application, content and/or service can be settled using the foregoing multiparty settlement system described in the foregoing section. Likewise, any adjustments made via CRM 720 can apply to any billing event, regardless of the origin of the billing event.

Figure 8:
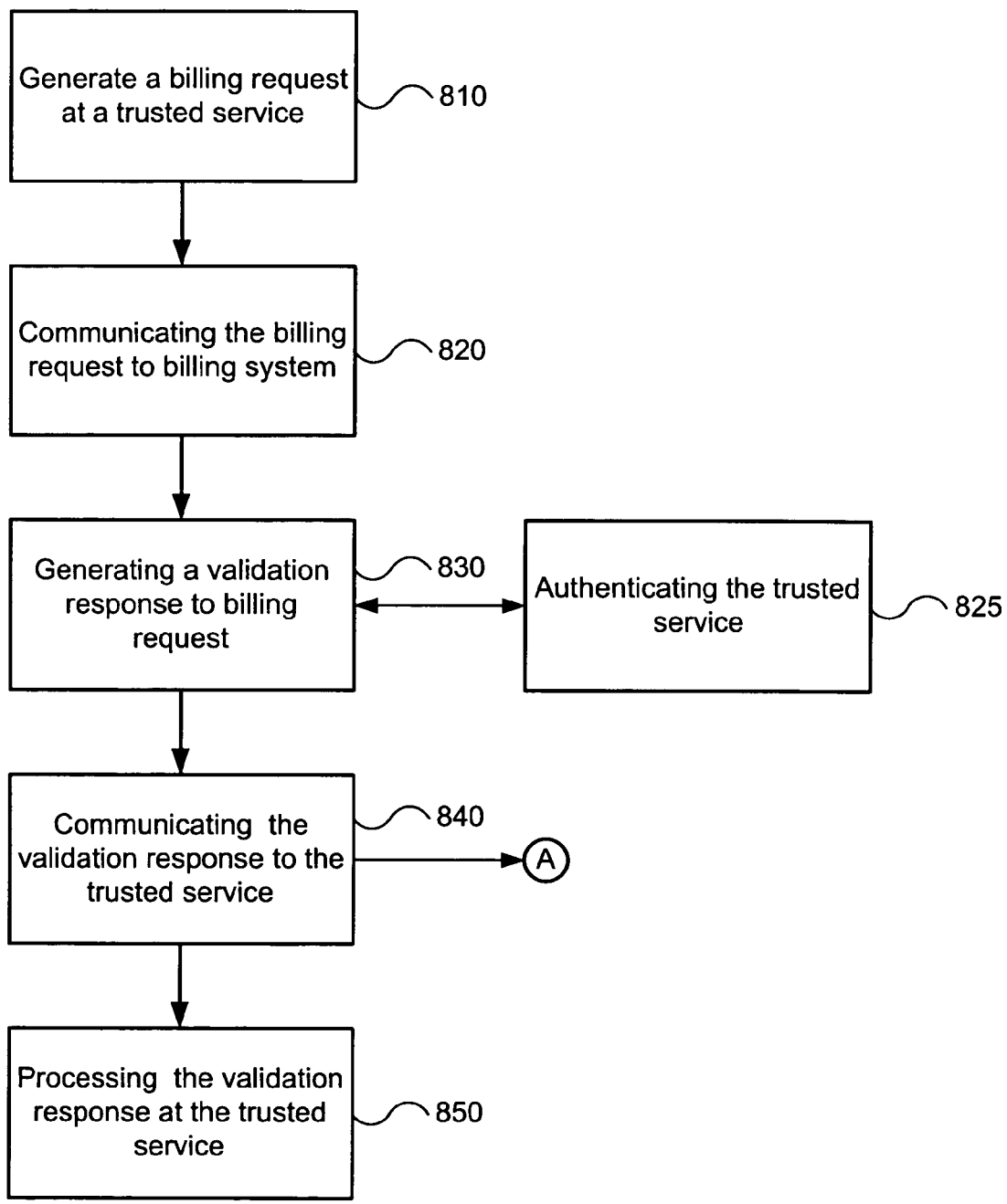
FIGS. 8-11 are flowcharts illustrating methods in accordance with embodiments of the invention

In view of the foregoing disclosure, those skilled in the art will recognize that embodiments of the invention include methods of performing the sequence of actions, operations and/or functions previously discussed. For example, referring to FIG. 8 a method according to an embodiment of the invention is illustrated. A billing request can be generated at a trusted service (e.g., a retail store, web site, and the like), block 810. The billing request including billing information is communicated to a wireless subscriber billing system, block 820. As discussed above, the communication can be any means of wire and/or wireless communication to the remote trusted service (e.g., Internet, LAN, WAN, wireless connection, and the like). A validation response to the billing request is generated in the wireless subscriber billing system, block 830 and communicated to the to the trusted service, block 840. The trusted service may be authenticated prior to processing the billing request to ensure no fraudulent billing events are processed, block 825. As discussed above, the billing request can be digitally signed at the trusted service prior to transmitting the billing request as part of the authenticating the transmission of the billing request from the trusted service.

Additionally, as discussed in the foregoing the billing information in the billing request can include a variety of information used for processing and tracking the transaction such as subscriber ID, provider ID/content payee, a content/item ID, retail price, and/or billing description. However, as will be appreciated by those skilled in the art, not all of these fields are required nor is this a complete listing of the possible fields to be used. For example, a bill to subscriber ID and a deliver to subscriber ID may be defined in the billing request in a gifting type scenario. Alternatively, a subscriber ID may only represent a bill to or a deliver to ID depending on the type of transaction. For example, SVB can be used to purchase items/services external to the wireless subscriber system, but use the wireless subscriber billing system to bill the wireless subscriber and settle the transaction. Alternatively, in the Alt Buy examples discussed above, an item (e.g., application, content, service, and the like) available in the wireless subscriber system can be purchased external to the wireless subscriber system and the SID can be used for purposes of identifying the delivery to device/subscriber (e.g., an application will be available for download at a zero price level). Accordingly, the information contained in the billing request or later associated with a billing event can vary based upon many factors, such as the type of transaction, and the specific preferences of the parties involved in the transaction (e.g., operator, provider(s), trusted service, and the like).

Referring back to FIG. 8, after the validation response is received, it can be processed at the trusted service, block 850. The processing of the validation response can also vary depending on the type of transaction. For example, in the SVB transaction that is using the wireless subscriber billing system to bill the wireless subscriber for a purchase external to the wireless system, the response will typically be an approval or denial and the purchased item (e.g., service, article, etc.) will not be provided unless an approval is received. However, in the Alt Buy scenario, since the item is purchased external to the wireless subscriber system and the item is typically only being delivered via the wireless subscriber system, the validation response may just be an acknowledgement that the request is received. In either scenario, additional requests may be generated if a validation response is not received and can be distinguished from separate transactions by associating a tracking ID in the billing request so that the duplicate transactions can be easily identified.

Figure 9:
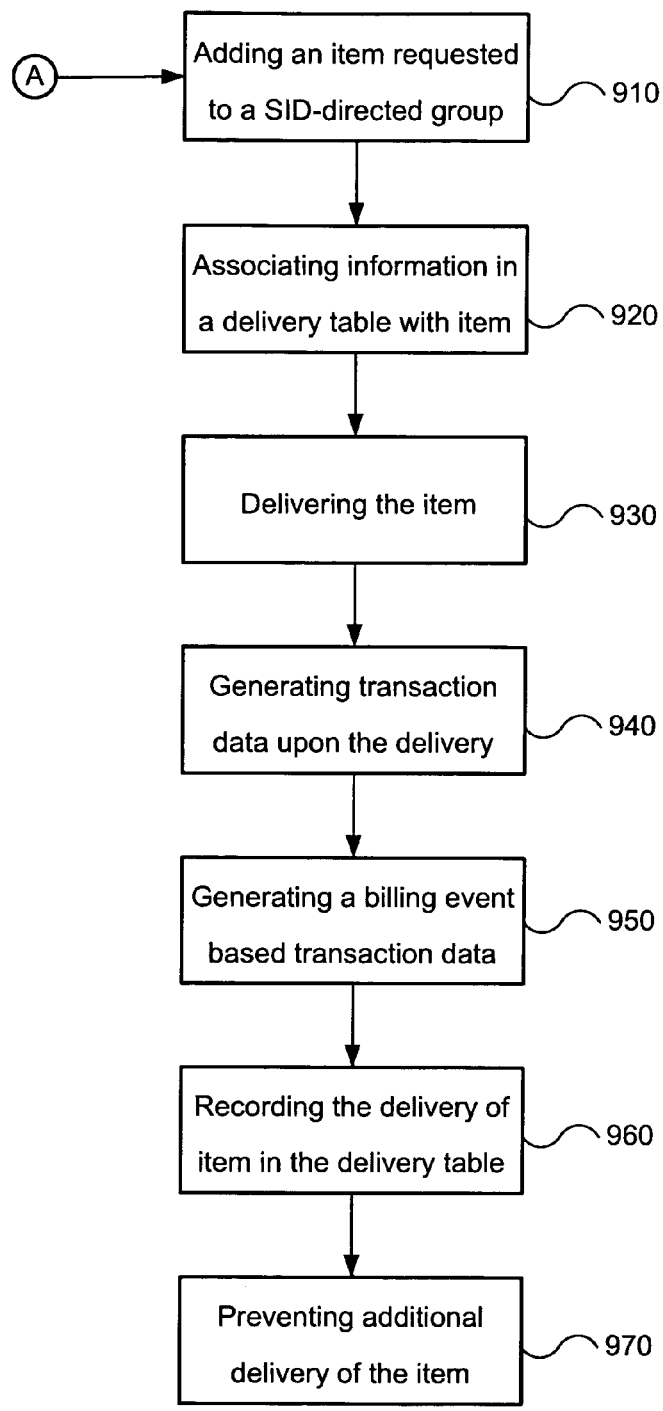

Referring to FIG. 9, after the billing request is acknowledged in the Alt Buy scenario, for example, a purchased item (e.g., application) available from the wireless carrier (e.g., in the main/commercial catalog) can be delivered to the device/subscriber associated with the SID in the billing request. For example, referring to FIG. 9, an item associated with the billing request can be added from a main catalog to a group directed to a subscriber ID (SID-directed group) associated with the billing request, block 910. To track delivery of an item, information in a delivery table can be associated with the item in the SID-directed group, block 920. The item can then be delivered, block 930. For example, the item can be downloaded from or pushed to a client device associated with the SID from the SID-directed group. However, delivery of the item can take many forms, such as the activation of an additional service, streaming of media, and is not limited to a download to the client device.

Transaction data can be generated upon the download of the item using the information in delivery table, block 940, and a billing event can be generated based on the transaction data, block 950. If the item was paid for in the Alt Buy scenario, the information in the delivery table can include a zero value retail price for the item and likewise the transaction data and billing event each can include a zero value retail price for the item. Accordingly, the item can be delivered and the delivery tracked and reported through the billing system without generating a bill to the subscriber. Alternatively, the value could be greater than zero, but less than the full retail price in the main catalog and the discounted price can be processed through the billing system and a subscriber billed a discounted amount.

Figure 10:
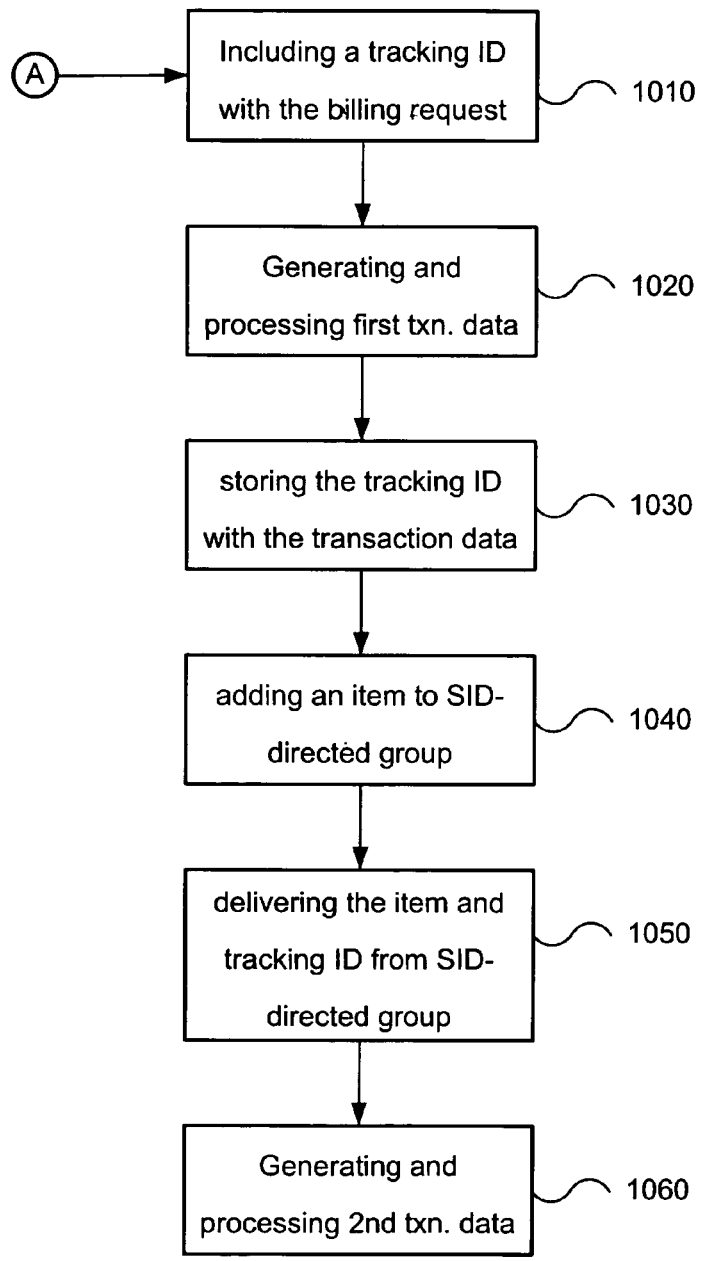

Referring to FIG. 10, as mentioned above, an alternative embodiment can include a tracking ID with the billing request, block 1010. First transaction data including the tracking ID can be generated based on the billing request and the first transaction data can be processed (e.g., subscriber billed, providers paid, and/or reports generated), block 1020. The tracking ID can be stored with the transaction data, block 1030, for later retrieval and usage with other transactions. An item that is the subject of the billing request can be added from the main catalog to a subscriber ID directed (SID-directed) group associated with a SID/client device and the tracking ID can be associated to the item in the SID-directed group, block 1040. The item and associated tracking ID can be delivered from the SID-directed group, block 1050. For example, the item and metadata including the tracking ID can be downloaded to a client device. Second transaction data including the tracking ID can be generated and processed upon the delivery of the item, block 1060. The second transaction data can be processed through the billing system in a similar manner as the first transaction data and the tracking ID can be used to associate both transactions.

Accordingly, a first transaction including a tracking ID based on a SVB generated billing event can cause a billing and settlement of the transaction, such as the external purchase of an application, in an Alt Buy scenario. The transaction and tracking ID metadata can be stored in the billing system. When the application is actually downloaded to a client device, the tracking ID can be passed to the client device, and a second transaction can be generated based on the download. The second transaction can include a special pricing handle from the delivery table so the subscriber is not billed on the download, as discussed above. However, the event can be processed through the billing system, so that delivery of the item can be tracked and reported to the carrier and provider(s) of the item (e.g., application). Once again, the tracking ID will be included with the second transaction data and can be stored in the billing system for later retrieval, reporting and the like. Accordingly, purchases/billing requests generated external to the wireless subscriber billing system can be tracked end to end, from billing request through settlement and delivery of the item.

Figure 11:
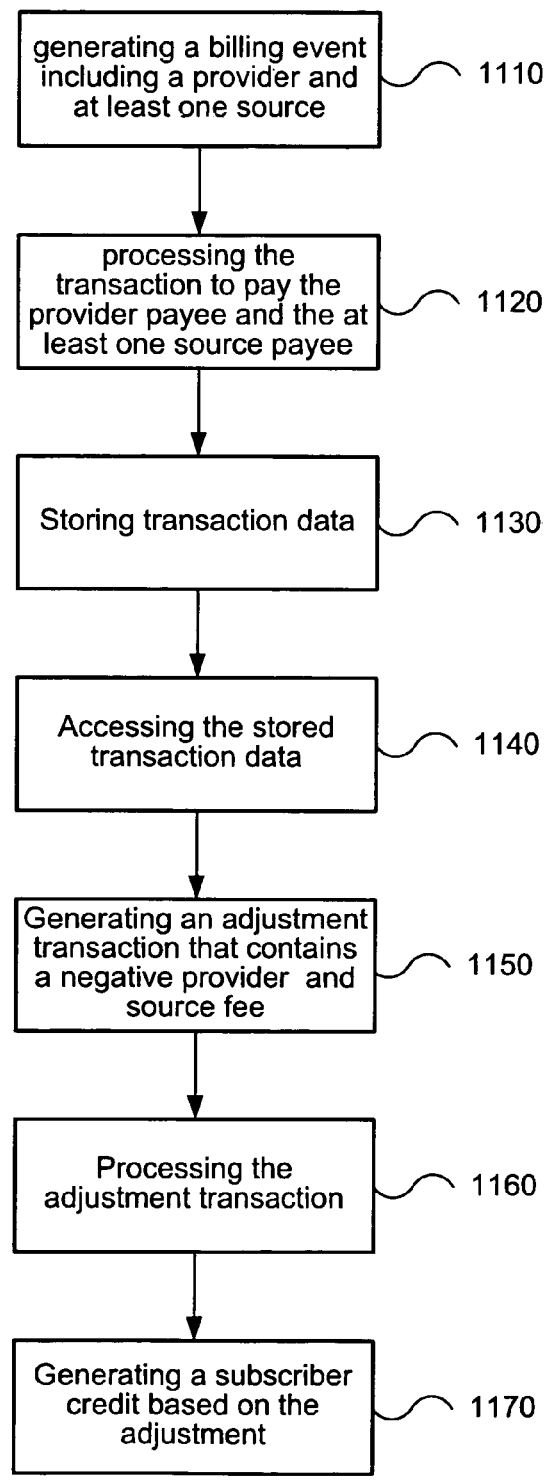

Another embodiment as illustrated in FIG. 11 can include a method of processing multi-party billing events in a wireless subscriber billing system. A billing event is generated that includes a provider fee and payee, and at least one source fee and payee associated with a transaction, block 1110. For example, a publisher could provide an item that includes a combination of applications and content (e.g., music, video and the like) for download by a wireless subscriber. The billing event can be generated when the item is downloaded to the client device, as discussed above. Metadata associated with the item can include the information to process the transaction through the wireless subscriber billing system. Specifically, the information can include provider payee (e.g., publisher ID and related information) and fee (e.g., the amount the publisher is paid) for the item. Likewise, information on each source payee (e.g., developer ID, content provider ID) and fee for each source (e.g., the amount the developer is paid for the application and the content provider is paid for the content) can also be associated with the item. Accordingly, the multiparty transaction can be billed and settled automatically by the billing system, e.g., the transaction is processed to distribute payment to the provider payee and each source payee, block 1120.

The transaction data can be stored for further processing, data mining and CRM services, block 1130. For CRM adjustment purposes, the stored transaction data can be accessed, block 1140. An adjustment transaction can be generated that contains a negative provider fee and at least one negative source fee based on the stored transaction data, block 1150. The adjustment transaction can be processed to debit the provider payee and the at least one source payee based on the negative provider fee and the at least one negative source fee, block 1160. The adjustment transaction can be proportional for each of the parties that derived revenue from the initial multi-party transaction. Likewise, a subscriber credit can be generated based on the adjustment proportion and the retail price for the item, block 1170. For example, assume an item is purchased at a given retail price. The operator, provider and source each may derive revenue off of the retail price at a pre-established ratio (e.g., as defined by respective fees associated with the item). The wireless subscriber billing system can automatically bill the subscriber and pay the respective parties based upon the fees associated with the item and this information can be stored for later access, as previously discussed. Upon a determination by a CRM representative that a subscriber should be credited or refunded a portion of the purchase, the adjustment transaction can be processed as a negative billing event. Thus, the wireless subscriber billing system can access the stored transaction data and debit each party (e.g., operator, provider, and source) in proportion to the respective fees paid from the original transaction. Accordingly, the adjustments can automatically propagate through the billing system and be apportioned to all parties, which can significantly reduce the manual effort with settling and CRM services.

In further embodiments, those skilled in the art will appreciate that the foregoing methods can be implemented by the execution of a program embodied on a computer readable medium, such as the memory of a computer platform. The instructions can reside in various types of signal-bearing or data storage primary, secondary, or tertiary media. The media may comprise, for example, RAM accessible by, or residing within, the client device and/or server. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, or EEPROM), flash memory cards, an optical storage device (e.g. CD-ROM, WORM, DVD, digital optical tape), paper "punch" cards, or other suitable data storage media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

The invention claimed is:
1. A method comprising:
receiving a billing request from a trusted service, the billing request corresponding to a third-party transaction between the trusted service and a client device of a carrier network, wherein the third-party transaction includes a purchased item purchased by the client device;
communicating the billing request including billing information to a validation component of a wireless subscriber billing system of the carrier network;

receiving a validation response to the billing request from the validation component of the wireless subscriber billing system;

communicating the validation response to the trusted service;

adding the purchased item corresponding to the billing request to a subscriber identification information-directed (SID-directed) group of catalog items selected from a main catalog based on a subscriber identification information (SID) corresponding to the client device; and presenting the SID-directed group including the purchased item to the client device.

2. The method of claim 1, further comprising:
authenticating the trusted service prior to processing the billing request.

3. The method of claim 2, wherein authenticating further comprises validating a digital signature of the trusted service associated with the billing request.

4. The method of claim 1, wherein the billing information comprises at least one of subscriber ID, provider payee, item ID, retail price, and billing description.

5. The method of claim 1, further comprising:
returning an error code in response to the billing request being invalid.

6. The method of claim 1, further comprising:
delivering the purchased item to the client device.

7. The method of claim 1, further comprising:
associating the purchased item with local billing information in a delivery table, wherein the local billing information corresponds to the third-party transaction, and wherein the local billing information differs from main catalog billing information corresponding to the main catalog for the purchased item.

8. The method of claim 7, further comprising:
generating transaction data upon a delivery of the purchased item using the local billing information in the delivery table; and
generating a billing event based on the transaction data.

9. The method of claim 8, wherein the delivery of the purchased item comprising downloading the purchased item from the SID-directed group to the client device, wherein the local billing information in the delivery table is operable to cause association of a zero value price with the downloading of the purchased item.

10. The method of claim 7, further comprising:
recording a delivered state in the delivery table indicating a delivery of the purchased item.

11. The method of claim 10, further comprising:
preventing further downloads when the billing information in the delivery table associated with the purchased item is set to the delivered state.

12. The method of claim 1, further comprising:
including a tracking ID with the billing request;
generating first transaction data including the tracking ID based on the billing request; and
processing the first transaction data.

13. The method of claim 12, wherein processing the first transaction data further comprises:
generating a subscriber bill;
distributing payment to a provider; and
transmitting reporting data based on the first transaction data to at least one of an operator and the provider.

14. The method of claim 12, wherein processing the first transaction data further comprises:
storing the tracking ID with the first transaction data.

15. The method of claim 12, further comprising:
associating the tracking ID with the purchased item.

16. The method claim 15, further comprising:
delivering the purchased item and the tracking ID to the client device.

17. The method of claim 16, further comprising:
generating second transaction data on the delivery of the purchased item including the tracking ID; and
processing the second transaction data.

18. The method of claim 17, wherein processing the second transaction data further comprises:
preventing billing a subscriber when processing the first transaction data includes generating a subscriber bill.

19. An apparatus comprising:
a service value billing (SVB) module in a wireless subscriber billing system configured to receive a billing request from a trusted service, the billing request corresponding to a third-party transaction between the trusted service and a client device of a carrier network, wherein the third-party transaction includes a purchased item purchased by the client device;
validation logic configured to generate a validation response in response to the billing request;
logic configured to add the purchased item corresponding to the billing request to a subscriber identification information-directed (SID-directed) group of catalog items selected from a main catalog based on a subscriber identification information (SID) corresponding to the client device; and
logic configured to present the SID-directed group including the purchased item to the client device.

20. The apparatus of claim 19, further comprising:
a transaction manager (TXN) configured to receive transaction data related to the billing request and generate a billing event;
a client billing module configured to receive the billing event from the transaction manager and generate a bill; and
a settlement module configured to receive the billing event from the transaction manager, to invoice a carrier, and to pay a provider.

21. The apparatus of claim 20, wherein the TXN associates additional billing information with the billing request to generate the billing event.

22. The apparatus of claim 19, wherein the billing request is generated by the trusted service.

23. The apparatus of claim 22, wherein the billing request comprises a digital signature operable to authenticate the trusted service.

24. The apparatus of claim 19, wherein the billing request comprises at least one of subscriber ID, provider payee, item ID, retail price, and billing description.

25. The apparatus of claim 19, further comprising:
a delivery table including local billing information corresponding to the third-party transaction and associated with the purchased item in the SID-directed group, wherein the local billing information differs from main catalog billing information corresponding to the main catalog for the purchased item.

26. The apparatus of claim 25, wherein the local billing information in the delivery table is operable to cause association of a zero value price with a download of the purchased item.

27. The apparatus of claim 25, further comprising:
logic configured to record a delivered state in the delivery table, wherein the delivered state indicates a delivery of the purchased item; and logic configured to prevent further downloads when the local billing information in the delivery table associated with the purchased item is set to the delivered state.

28. A system comprising:
means for receiving a billing request including billing information from a trusted service at a wireless subscriber billing system, the billing request corresponding to a third-party transaction between the trusted service and a client device of a carrier network, wherein the third-party transaction includes a purchased item purchased by the client device;
means for generating a validation response to the billing request in the wireless subscriber billing system;
means for communicating the validation response to the trusted service;
means for adding the purchased item corresponding to the billing request to a subscriber identification information-directed (SID-directed) group of catalog items selected from a main catalog based on a subscriber identification information (SID) corresponding to the client device; and
means for presenting the SID-directed group including the purchased item to the client device.

29. The system of claim 28, further comprising:
means for authenticating the trusted service prior to processing the billing request.

30. The system of claim 28, wherein the billing information comprises at least one of subscriber ID, provider payee, item ID, retail price, and billing description.

31. The system of claim 28, further comprising:
means for delivering the purchased item; and
means for associating local billing information in a delivery table with the purchased item, wherein the local billing information differs from main catalog billing information corresponding to the main catalog for the purchased item.

32. The system of claim 31, further comprising:
means for generating transaction data upon delivery of the purchased item using the local billing information in delivery table; and
means for generating a billing event based on the transaction data.

33. The system of claim 31, wherein the local billing information in the delivery table is operable to cause association of a zero value price with a download of the purchased item.

34. The system of claim 33, further comprising:
means for recording a delivered state in the delivery table indicating a delivery of the purchased item; and
means for preventing further downloads when the local billing information in the delivery table associated with the purchased item is set to the delivered state.

35. A non-transitory computer-readable medium comprising instructions which, upon being executed, causes a computing device to perform operations, the instructions comprising:
at least one instruction for receiving a billing request from a trusted service, the billing request corresponding to a third-party transaction between the trusted service and a client device of a carrier network, wherein the third-party transaction includes a purchased item purchased by the client device;
at least one instruction for generating a validation response to the billing request in the wireless subscriber billing system;
at least one instruction for communicating the validation response to the trusted service;
at least one instruction for adding the purchased item corresponding to the billing request to a subscriber identification information-directed (SID-directed) group of catalog items selected from a main catalog based on a subscriber identification information (SID) corresponding to the client device; and
at least one instruction for presenting the SID-directed group including the purchased item to the client device.

36. A method comprising:
receiving a billing request from a trusted service, the billing request corresponding to a third-party transaction between the trusted service and a client device of a carrier network, wherein the client device corresponds to a subscriber ID (SID), and wherein the third-party transaction includes a purchased item purchased by the client device;
communicating the billing request including billing information to a wireless subscriber billing system, wherein the trusted service comprises a third-party external to the wireless subscriber billing system;
receiving a validation response to the billing request from the wireless subscriber billing system;
communicating the validation response to the trusted service;
adding the purchased item to a SID-directed group of catalog items selected from a main catalog based on the subscriber ID, the purchased item corresponding to the billing request; and
presenting the SID-directed group including the purchased item to the client device.

* * * * *